United States Patent
Sato

(10) Patent No.: US 9,888,209 B1
(45) Date of Patent: Feb. 6, 2018

(54) REMOTE COMMUNICATION SYSTEM, METHOD FOR CONTROLLING REMOTE COMMUNICATION SYSTEM, AND STORAGE MEDIUM

(71) Applicant: CANON KABUSHIKI KAISHA, Tokyo (JP)

(72) Inventor: Hirochika Sato, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/658,194

(22) Filed: Jul. 24, 2017

(30) Foreign Application Priority Data

Jul. 29, 2016 (JP) .................................. 2016-150103

(51) Int. Cl.
*H04N 7/14* (2006.01)
*G06K 9/46* (2006.01)
*G06K 9/00* (2006.01)

(52) U.S. Cl.
CPC ......... *H04N 7/147* (2013.01); *G06K 9/00355* (2013.01); *G06K 9/4604* (2013.01)

(58) Field of Classification Search
CPC combination set(s) only.
See application file for complete search history.

(56) References Cited

U.S. PATENT DOCUMENTS

| | | | | |
|---|---|---|---|---|
| 2012/0056975 A1* | 3/2012 | Yamashita | ............ | H04N 7/148 348/14.13 |
| 2012/0140021 A1* | 6/2012 | Tanaka | ................... | H04N 7/142 348/14.07 |
| 2013/0060926 A1* | 3/2013 | Kato | .................... | H04L 65/605 709/223 |
| 2017/0278258 A1* | 9/2017 | Kurz | ..................... | G06T 7/593 |

FOREIGN PATENT DOCUMENTS

JP      2004-56207 A      2/2004

* cited by examiner

*Primary Examiner* — Joseph J Nguyen
(74) *Attorney, Agent, or Firm* — Canon USA, Inc. I.P. Division

(57) ABSTRACT

A first information processor in a conference room acquires the image of a document placed on a first projection surface as a material shared with a remote site. The first information processor extracts an image indicating a user based on an image obtained by capturing the image of an area including a projection area projected to a projection surface and a distance acquired by a sensor. A second information processor at the remote site extracts an image indicating a user at the remote site based on an image obtained by capturing the image of an area including a projection area projected to the projection surface and a distance acquired by a sensor. The first information processor projects an image indicating the user at the remote site. The second information processor projects the images of the document acquired by the first information processor and the user located at the remote site.

10 Claims, 22 Drawing Sheets

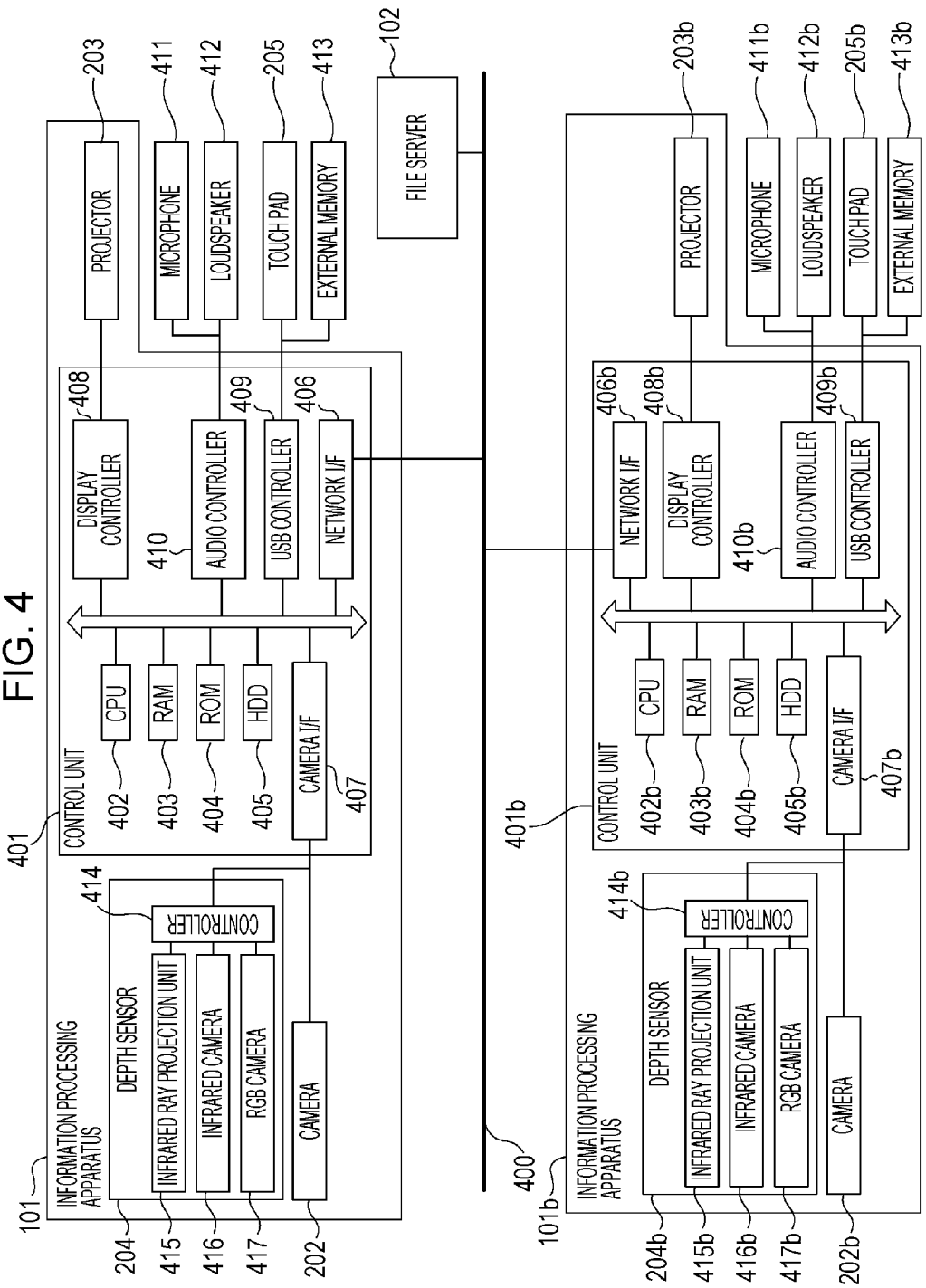

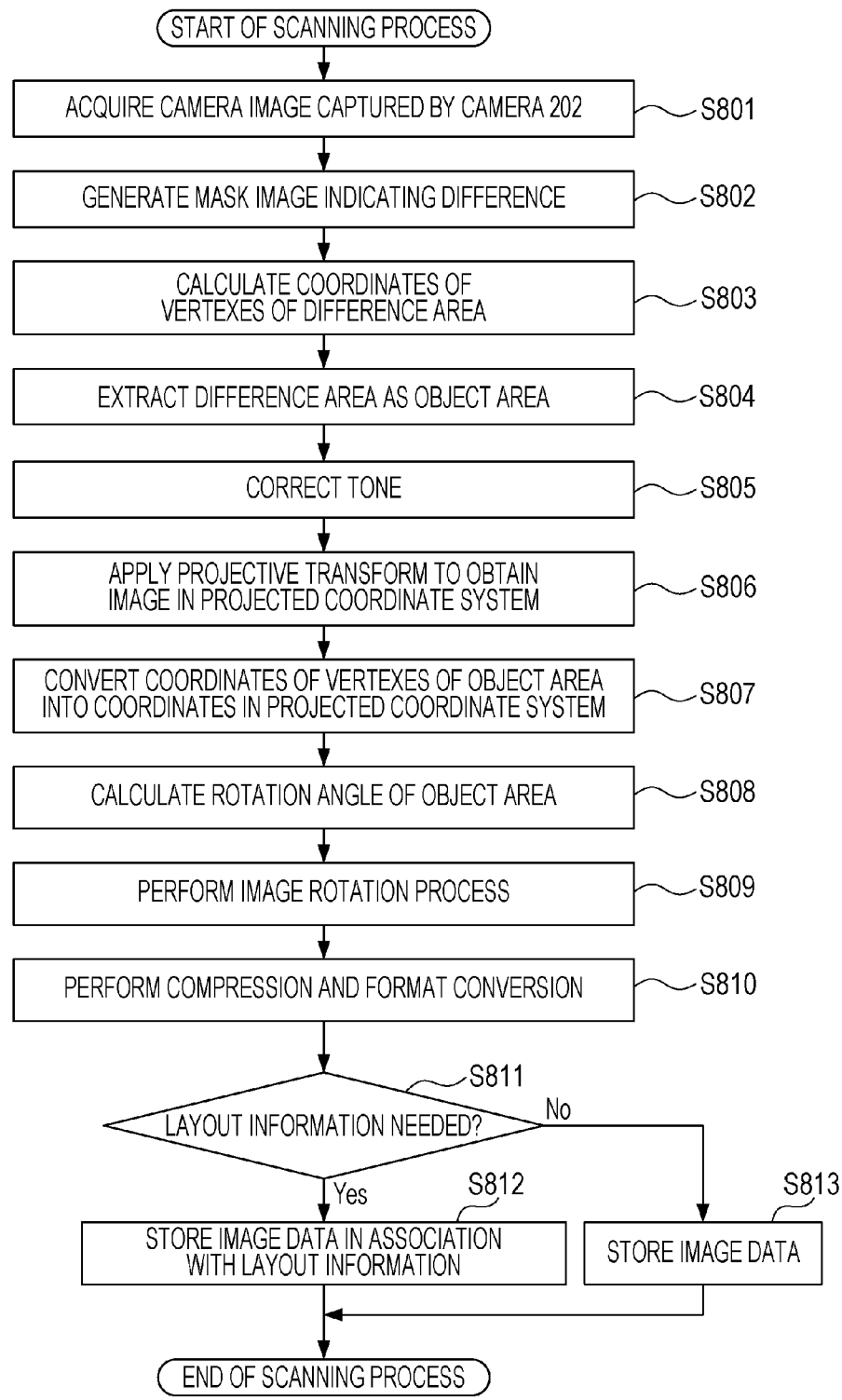

REMOTE COMMUNICATION SYSTEM, METHOD FOR CONTROLLING REMOTE COMMUNICATION SYSTEM, AND STORAGE MEDIUM

BACKGROUND OF THE INVENTION

Field of the Invention

The present disclosure relates to at least one embodiment of a remote communication system for communicating with a remote site, at least one embodiment of a method for controlling a remote communication system, and at least one storage medium for use therewith.

Description of the Related Art

Systems for communicating with a communication partner located at a remote site (a remote location) have been developed. For example, Japanese Patent Laid-Open No. 2004-56207 describes a remote communication system that transmits both a video including the face and upper body of a user and a video including the image around the hands of the user to a communication partner located at a remote site. In the communication system described in Japanese Patent Laid-Open No. 2004-56207, since the image around the hands is transmitted to a remote site, the communication partner at the remote site can understand a situation where the user points to a particular item with their hand or finger.

SUMMARY OF THE INVENTION

At least one aspect of the present disclosure provides at least one embodiment of a remote communication system including a first information processing apparatus and a second information processing apparatus set at a remote site. The first information processing apparatus includes a first projection device and at least one control circuit configured to function as: a first projection unit that controls the first projection device to project an image onto a first projection surface, an acquisition unit that acquires, as a meeting material shared with a user at the remote site, an image of a document placed on the first projection surface, a first image capturing unit that captures an image of an area including a projection area projected by the first projection device by using an imaging device, a first detection unit that detects a distance to an object for each of pixels of an image captured by the first image capturing unit, and a first extraction unit that extracts an image indicating a user and included in the image captured by the first image capturing unit on a basis of the distances detected by the first detection unit. The second information processing apparatus includes a second projection device and at least one control circuit configured to function as: a second projection unit that controls the second projection device to project an image onto a second projection surface, a second image capturing unit that captures an image of an area including a projection area projected by the second projection device by using an imaging device, a second detection unit that detects a distance to an object for each of pixels of the image captured by the second image capturing unit, and a second extraction unit that extracts an image indicating a user located at the remote site and included in the image captured by the second image capturing unit on a basis of the distances detected by the second detection unit. The first projection unit projects, onto the first projection surface, an image including at least an image indicating the user at the remote site and extracted by the second extraction unit, and the second projection unit projects, onto the second projection surface, the image of the document acquired by the acquisition unit and the image indicating the user extracted by the first extraction unit.

At least another aspect of the present disclosure provides at least one embodiment of a remote communication system including a first information processing apparatus and a second information processing apparatus set at a remote site. The first information processing apparatus includes a first projection device and at least one control circuit configured to function as: a first projection unit that controls the first projection device to project an image onto a first projection surface, a first image capturing unit that captures an image of an area including a projection area projected by the first projection unit by using an imaging device, and a generation unit that generates an image of an area corresponding to the projection area from the image captured by the first image capturing unit. The second information processing apparatus includes a second projection device and at least one control circuit configured to function as: a second projection unit that controls the second projection device to project an image onto a second projection surface, a second image capturing unit that captures an image of an area including a projection area projected by the second projection unit by using an imaging device, a detection unit that detects a distance to an object for each of pixels of the image captured by the second image capturing unit, and an extraction unit that extracts an image which indicates a user located at the remote site and which is included in the image captured by the second image capturing unit on a basis of the distances detected by the detection unit. The first projection unit projects, onto the first projection surface, an image including at least the image which indicates the user at the remote site and which is extracted by the extraction unit, and the second projection unit projects, onto the second projection surface, the image generated by the generation unit.

According to other aspects of the present disclosure, one or more additional remote communication systems, one or more methods for controlling same, and one or more storage mediums for use therewith are discussed herein. Further features of the present disclosure will become apparent from the following description of exemplary embodiments with reference to the attached drawings.

BRIEF DESCRIPTION OF THE DRAWINGS

FIG. 4 is a block diagram of an example of the hardware of the system according to at least one exemplary embodiment of the present disclosure.

FIG. 8 is a flowchart related to an example of a scanning process of an object according to at least one exemplary embodiment of the present disclosure.

DESCRIPTION OF THE EMBODIMENTS

When a small number of people who are physically in the same space (for example, the same room) view the same meeting material and communicate with one another, the meeting material is placed on a table and, then, the people point their hands or fingers to the meeting material to communicate with one another, in general. If such a communication form or the like is applied to communication with people at a remote site, the people can easily communicate with one another.

For example, in the case where a user "a" at site A communicates with a user "b" at remote site B by using the system described in Japanese Patent Laid-Open No. 2004-56207, the user a at site A can inform the user b at site B of the status of work at their hand. At this time, by enabling the user b at site B to point with their hand or finger to the work results of the user a at site A and let the user a at site A to identify the pointed reference point of the results, the communication between the users a and b can be facilitated.

One aspect of the present exemplary embodiment is to provide a mechanism for facilitating communication among persons when remote communication is performed with a person at a remote site by viewing the same meeting material.

Exemplary embodiments of the present disclosure are described below with reference to the accompanying drawings. The following description of exemplary embodiments is merely illustrative in nature and is in no way intended to limit the invention recited in the claims, its application, or uses. All of the features and the combinations thereof described in the embodiment(s) are not necessarily essential to the invention.

Figure 1A:
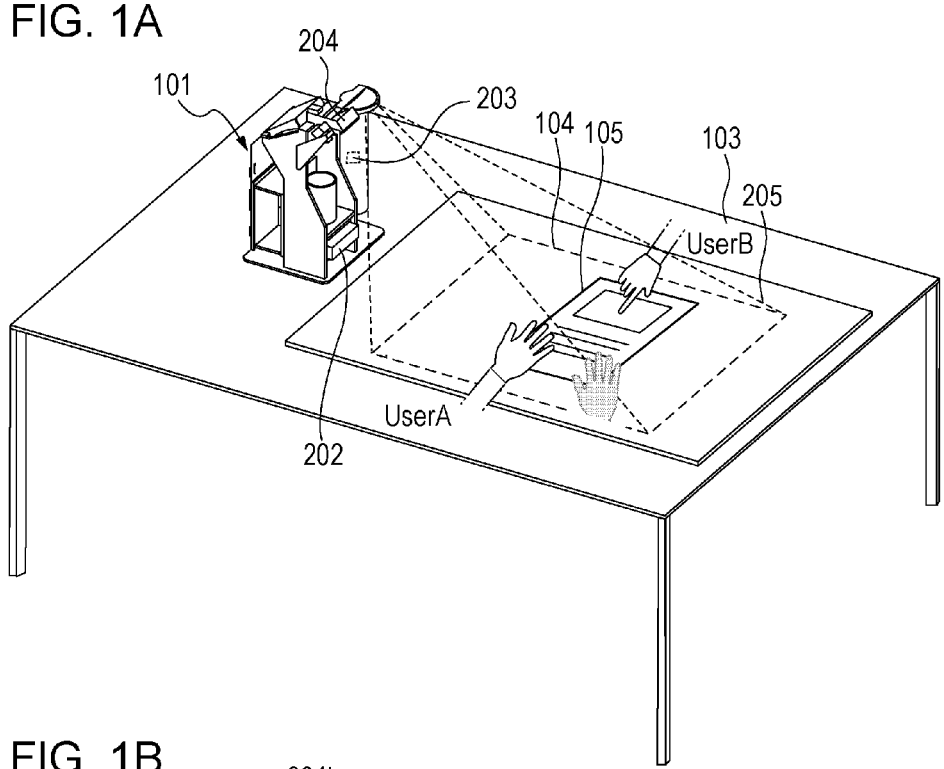
FIGS. 1A and 1B are external views of an example of a system according to at least one exemplary embodiment of the present disclosure.
Figure 1B:
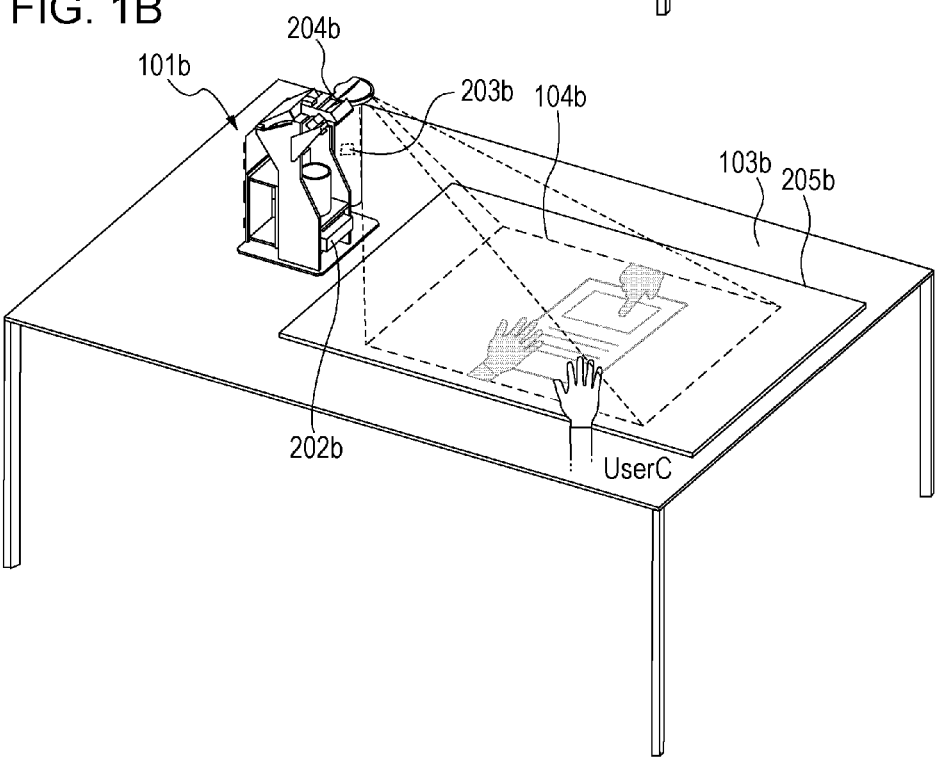

FIGS. 1A and 1B are external views of a remote communication system according to the present exemplary embodiment. By using the remote communication system, communicate is available between a conference room A and a conference room B. While the following description is given with reference to two conference rooms as an example, the remote communication system may have a configuration in which communication is available among three or more conference rooms. Note that all of the plurality of sites may be referred to as a remote communication system, or only a configuration included in one office may be referred to as a remote communication system.

In addition, the conference rooms may be located within a few hours of each other or may be different rooms within the same building. That is, as used herein, the term "remote" is used not only when there are physical distances between the rooms, but also when it is difficult for the users to communicate with each other face to face in the same space, such as when the space of each of the conference rooms is partitioned by a wall or the like.

As illustrated in FIG. 1A, an information processing apparatus 101 for supporting communication is set in conference room A in which User A and User B are located.

Figure 2A:
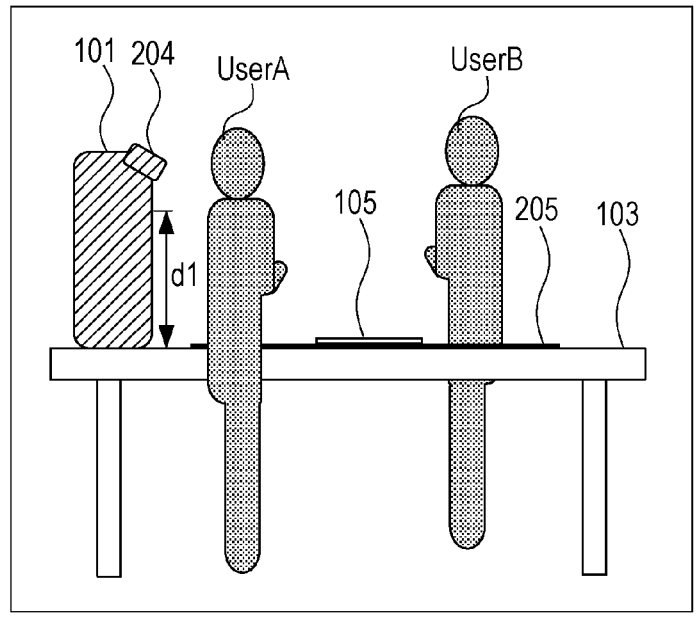
FIGS. 2A and 2B are side views of an example of a system according to at least one exemplary embodiment of the present disclosure.
Figure 2B:
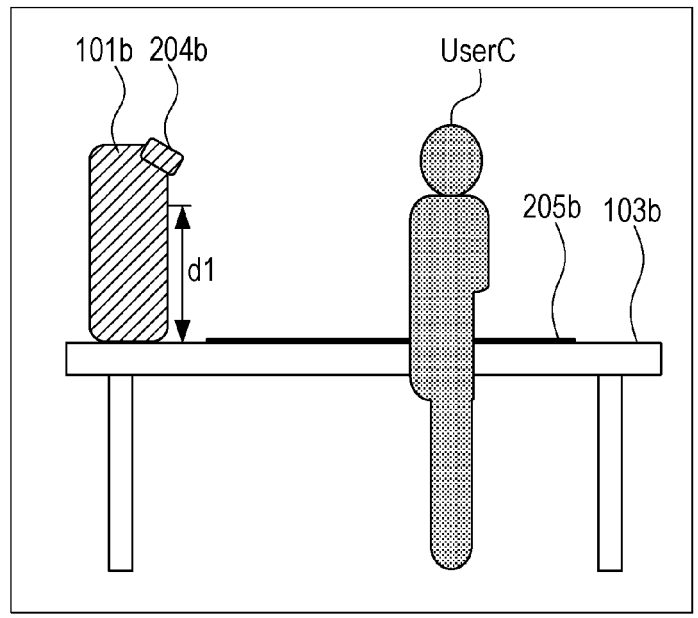

The configuration of the information processing apparatus 101 is described first with reference to FIGS. 1A, 1B, 2A, and 2B. FIGS. 2A and 2B are a side view of the remote communication system according to the present exemplary embodiment.

The information processing apparatus 101 includes a projector 203, a camera 202, and a depth sensor 204. Note that for ease of understanding of the internal configuration, the outer package of the information processing apparatus 101 is not illustrated in FIGS. 1A and 1B. The projector 203 is a projection unit that projects an image onto a projection surface 103 of a desk. The camera 202 is an image capturing unit for capturing the image of an area including the projection surface 103. The information processing apparatus 101 has a scanning function for extracting, from the image captured by the camera 202, the area of an object 105 represented by paper document or the like and storing the area as image data.

In addition, the depth sensor 204 is a sensor for performing three-dimensional measurement. According to the present exemplary embodiment, the depth sensor 204 is used to extract an area corresponding to the hand of the user. As illustrated in FIG. 2A, the depth sensor 204 can acquire the distance information of a subject located between the projection surface and the depth sensor 204 and in a predetermined range d1. Furthermore, the depth sensor 204 can acquire a color image including the subject. Hereinafter, for convenience in distinction from the image captured by the camera 202, the color image acquired by the depth sensor 204 is referred to as an "RGB image". In this example, as illustrated in FIG. 1A and FIG. 2A, areas corresponding to the hands of User A and User B are included in the predetermined range d1. In addition, in this example, as illustrated in FIG. 1B and FIG. 2B, an area corresponding to the hand of User C is included in the predetermined range d1.

Furthermore, according to the present exemplary embodiment, a pointing motion in which a user points their arm, finger, or hand at a projection area 104 or at least part of a projection area 104b or an operation in which a user draws a circle with their finger or palm is referred to as a "gesture". In addition, the motion of the user holding an object, such as a pen or a pointer, with their fingers is referred to as a "gesture".

Furthermore, a touch pad 205 is connected to the information processing apparatus 101. The touch pad 205 is a touch based user input interface. The touch pad 205 detects the coordinates of a position pressed by the user. The touch pad 205 functions as a reception unit that receives an input from the user.

The projector 203 projects an image onto an area of the touch pad 205 set on the table, which serves as the projection surface 103. In FIG. 1A, the ranges in which an image can be projected by the projector 203 is indicated by a broken lines 104. Hereinafter, the range in which an image can be projected by the projector 203 is referred to as a projection area 104.

The projector 203 can project a GUI (Graphical User Interface), such as a message or a button, on the projection surface 103. The user operates the information processing apparatus 101 by their hands. The information processing apparatus 101 detects a selection operation of a GUI projected on the projection surface on the basis of the result of a pointing operation on the touch pad 205.

Remote Communication

The outline of remote communication using the information processing apparatuses according to the present exemplary embodiment is described below with reference to FIGS. 1A and 1B and FIGS. 2A and 2B.

In an example of remote communication illustrated in FIGS. 1A and 1B, User A and User B located in conference room A remotely communicate with User C located in conference room B.

In this example, an information processing apparatus 101b is placed in conference room B in which User C is located. The information processing apparatus 101b has a configuration the same as that of the information processing apparatus 101 placed in conference room A. In addition, like the information processing apparatus 101, a touch pad 205b is connected to the information processing apparatus 101b. Hereinafter, in the drawings, the equipment and projection area in conference room B identified by reference numerals each having a suffix "b" have configurations that are the same as the configurations of those in conference room A identified by reference numerals without the suffix "b".

The information processing apparatus 101 and the information processing apparatus 101b can perform remote communication with each other via a network (not illustrated in FIGS. 1A, 1B, 2A, and 2B).

In this case, as illustrated in FIGS. 1A, 1B, 2A, and 2B, User A and User B point their hands or fingers to the object 105, such as a physical paper document, placed on the touch pad 205.

In addition, as illustrated in FIG. 1B, a scanned image obtained by the camera 202 scanning the paper document in conference room A is projected onto the projection area 104b of conference room B by the projector 203b. In addition, gesture images obtained by extracting the pointing operations performed by User A and User B located in conference room A with their hands or fingers are projected by the projector 203b. By viewing the projection area 104b, User C can easily identify the communication status among User C and User A and User B in conference room A.

In addition, User C in conference room B points their hand or fingers to the work result in conference room A. The extracted gesture image representing the pointing operation performed by User C is transmitted to the information processing apparatus 101 set in conference room A and is projected onto the projection surface 103 by the projector 203. The gesture image is projected to a position at which the object 105, such as a paper document, is placed. Accordingly, User A and User B located in conference room A can identify the gesture being performed by User C located at a remote site as if they were reviewing the document physically in the same space. A method for sharing the same meeting material with a person in a remote site and performing remote communication illustrated in FIGS. 1A and 1B is described in detail below.

Information Processing Apparatus

Figure 3:
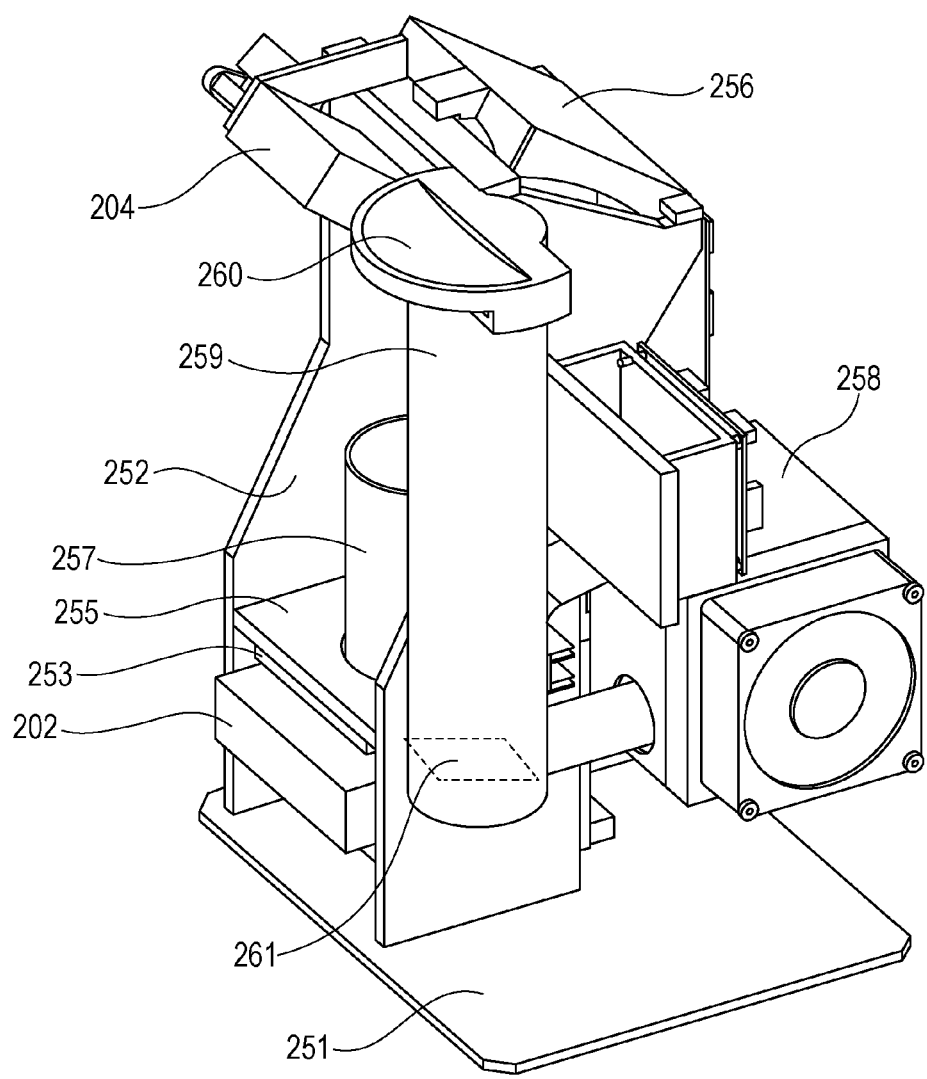
FIG. 3 is an external view of an example of an information processing apparatus according to at least one exemplary embodiment of the present disclosure.

Projection performed by the projector 203 of the information processing apparatus 101 and the image capturing operation of an area including the projection area performed by the camera 202 are described first with reference to FIG. 3. FIG. 3 is an external view of the information processing apparatus 101 viewed from another direction. For easy understanding of the internal configuration, the outer package is not illustrated in FIG. 3.

The projector 203 includes a light source unit 258 serving as a light source, a projector lens barrel unit 259 (a projection lens barrel unit) serving as a projection optical system, and a projection mirror 260. A plurality of lenses are arranged inside of the projector lens barrel unit 259. The light source unit 258 and the projector lens barrel unit 259 are connected to each other via a bent portion. The light source unit 258 is disposed on the distal side of the bent portion. A reflecting mirror 261 is disposed in the bent portion. The reflecting mirror 261 reflects light emitted from the light source unit 258 toward the projection mirror 260. The projection mirror 260 is disposed on the upper front side of the projector lens barrel 259. The projection mirror 260 reflects the light emitted from the light source unit 258 toward the projection surface 103 so as to project an image onto the projection area 104 of the touch pad 205. According to the present exemplary embodiment, a projection image having a width of "screen width" and a height of "screen height" is projected onto the projection area 104 illustrated in FIG. 1A. As a particular example, the projector 203 projects a projection image of 1920 dots×1080 dots. Note that the size of the projection image is not limited thereto.

Furthermore, the width, the height, and the display position of each of the projection area 104 onto which the information processing apparatus 101 projects a projection image and the projection area 104b onto which the information processing apparatus 101b projects a projection image are calibrated in advance so as to be the same width, height, and display position.

The configuration of the camera 202 is described below. A main frame 252 is fixed to the base 251. A camera attachment 253 is fixed to the main frame 252. The camera 202 includes a charge-coupled device (CCD) sensor (not illustrated) as an imaging element. The camera 202 is attached to a camera mount 255 via the camera attachment 253. The CCD sensor is attached so as to be substantially parallel to the projection surface 103. An imaging mirror 256 is assembled to the main frame 252. The imaging mirror 256 is a concave curved mirror. A camera lens barrel unit 257 (an imaging barrel unit) having a plurality of lenses incorporated thereinto and serving as an imaging optical system is attached onto the camera mount 255. The camera lens barrel unit 257 forms the image of an object on the CCD sensor included in the camera 202. When the image of an object placed in the projection area 104 is captured by the camera 202, the image of the object is reflected into the camera lens barrel unit 257 by the imaging mirror 256, passes through a plurality of lenses (not illustrated) provided in the camera lens barrel unit 257, and is scanned by the CCD sensor. An image formed on the imaging surface of the CCD sensor is converted into image data by an A/D conversion unit (not illustrated) included in the camera 202. According to the present exemplary embodiment, the camera 202 captures the image of an area wider than the projection area 104 projected by the projector 203 and generates the image data.

The hardware configuration of the remote communication system is described below with reference to FIG. 4. FIG. 4 is the hardware configuration diagram of the remote communication system. A central processing unit (CPU) 402 included in the control unit 401 reads out a control program stored in a read only memory (ROM) 404 or a hard disk drive (HDD) 405 and controls the units of the information processing apparatus 101 and peripheral devices connected to the information processing apparatus 101.

The control unit 401 includes the CPU 402, the RAM 403, the ROM 404, the HDD 405, a network interface (I/F) 406, a camera I/F 407, a display controller 408, a universal serial bus (USB) controller 409, and an audio controller 410. The CPU 402 is a central processing unit (a processor) that performs overall control of the operation of the control unit 401. The RAM 403 is a volatile memory and is used as a temporary storage area, such as a work area and an area to load various control programs stored in the ROM 404 and the HDD 405.

The ROM 404 is a nonvolatile memory. The ROM 404 stores, for example, a boot program of the information processing apparatus 101. The HDD 405 is a hard disk drive (HDD) with a larger capacity than the RAM 403. The HDD 405 stores the control program for the information processing apparatus 101. The CPU 402 executes the boot program stored in the ROM 404 when the information processing apparatus is started up, such as when the power is switched on. This boot program reads the control program stored in the HDD 405 and loads the control program onto the RAM 403. After executing the boot program, the CPU 402 executes the control program loaded onto the RAM 403 to control the information processing apparatus. In addition, the CPU 402 stores data used for the operations performed by the control program in the RAM 403 and reads and writes data from and to the RAM 403. The HDD 405 further stores various settings required for the operation performed by the control program, generated image data, and electronic meeting materials to be projected.

Note that in conference room A, the CPU 402 of the control unit 401, the RAM 403, and the controllers in the control unit 401 cooperate with one another to execute the processes illustrated in the flowcharts described below. However, another form of the processing can be employed. For example, a plurality of processors, a plurality of RAMS, HDD or solid state drives (SSDs) may cooperate with one another to execute the processes. Alternatively, some of the processes described below may be performed by using a hardware circuit, such as an application specific integrated circuit (ASIC) or a field-programmable gate array (FPGA).

The control unit 401 is connected to a network 400 via the network I/F 406. The CPU 402 transmits images and information to external apparatuses on the network 400 and receives images and information from the external apparatuses on the network 400 via the network I/F 406.

The control unit 401 is connected to the camera 202 and the depth sensor 204 via the camera I/F 407. The camera 202 can capture an image in response to a control instruction received from the CPU 402. The 8-bit 3-channel RGB image data obtained through the image capturing operation is transferred to the RAM 403 and is stored in the HDD 405.

The depth sensor 204 includes an infrared ray projection unit 415, an infrared camera 416, an RGB camera 417, and a controller 414. The infrared ray projection unit 415 projects a three-dimensional measurement pattern onto the object with infrared light that is invisible to the human eye. The infrared camera 416 is a camera that reads the three-dimensional measurement pattern projected onto the object. The RGB camera 417 is a camera that captures light visible to the human eye. The controller 414 controls the infrared ray projection unit 415 and the infrared camera 416 to acquire 8-bit single-channel range image data indicating the distance to the object. In addition, the controller 414 controls the RGB camera 417 to acquire 8-bit 3-channel RGB image data.

The range image data and the RGB image data acquired by the depth sensor 204 are transferred to the RAM 403 and are stored in the HDD 405.

The display controller 408 controls displaying of the image on the display in accordance with an instruction from the CPU 402. According to the present exemplary embodiment, the display controller 408 is connected to the projector 203. The projection image transferred from the display controller 408 to the projector 203 is a projection image with a size of "screen width" and a height of "screen height". As a particular example, the projection image is an image of 1920 dots×1080 dots. In addition, the projection mirror 260 of the projector 203 is a curved mirror so that an image projected onto the projection area 104 has an appropriate aspect ratio (for example, 16:9).

A microphone and a loudspeaker (neither is illustrated in FIGS. 1A, 1B, 2A and 2B) are connected to the information processing apparatus in each of the conference rooms. Speeches emanated from the persons in the conference rooms are converted into audio signals by the microphone and are output from a remote loudspeaker. The control unit 401 is connected to a microphone 411 and a loudspeaker 412 via the audio controller 410. The audio controller 410 converts the audio data received from the information processing apparatus 101b into an analog audio signal in response to an instruction from the CPU 402. The analog audio signal is output through the loudspeaker 412 connected to the information processing apparatus 101. In addition, the audio controller 410 converts the audio data input from the microphone 411 into a digital audio signal in response to an instruction from the CPU 402. The CPU 402 transmits the digital audio signal to the information processing apparatus 101b.

Furthermore, the control unit 401 is connected to the touch pad 205 via the USB controller 409. The CPU 402 acquires the coordinates of the position touched by the user with, for example, a pen or their finger on the touch pad 205. Furthermore, the USB controller 409 controls an external USB device in accordance with an instruction from the CPU 402. In this example, an external memory 413, such as a USB memory or a secure digital (SD) card, is connected to the information processing apparatus 101. By connecting the external memory 413 to the information processing apparatus 101, the user can project an electronic meeting material stored in the external memory 413 by using the projector or store the scanned image of an object captured by the camera 202 in the external memory 413.

Note that, in conference room B, the information processing apparatus 101b having the same configuration as in conference room A is provided. To connect the above-described devices to the controller and the interfaces, USB, High Definition Multimedia Interface (HDMI™), a wired local area network (LAN), a wireless LAN, a line cable, and the like are employed as needed.

In addition, the remote communication system includes a file server 102. The information processing apparatuses 101a and 101b can access the file server 102 and acquire a file stored in the file server 102. In addition, the information processing apparatuses 101a and 101b can upload files, such as an image data file, to the file server 102.

Operation Screen of Information Processing Apparatus

Figure 5A:
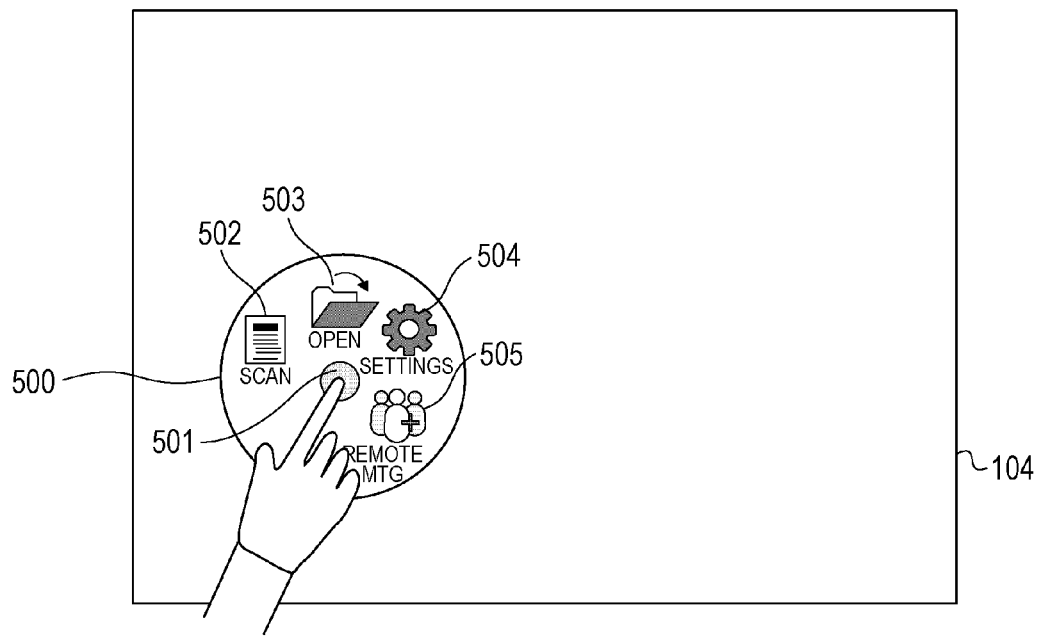
FIGS. 5A to 5C illustrate an example of operation screens projected onto a projection surface according to at least one exemplary embodiment of the present disclosure.
Figure 5B:
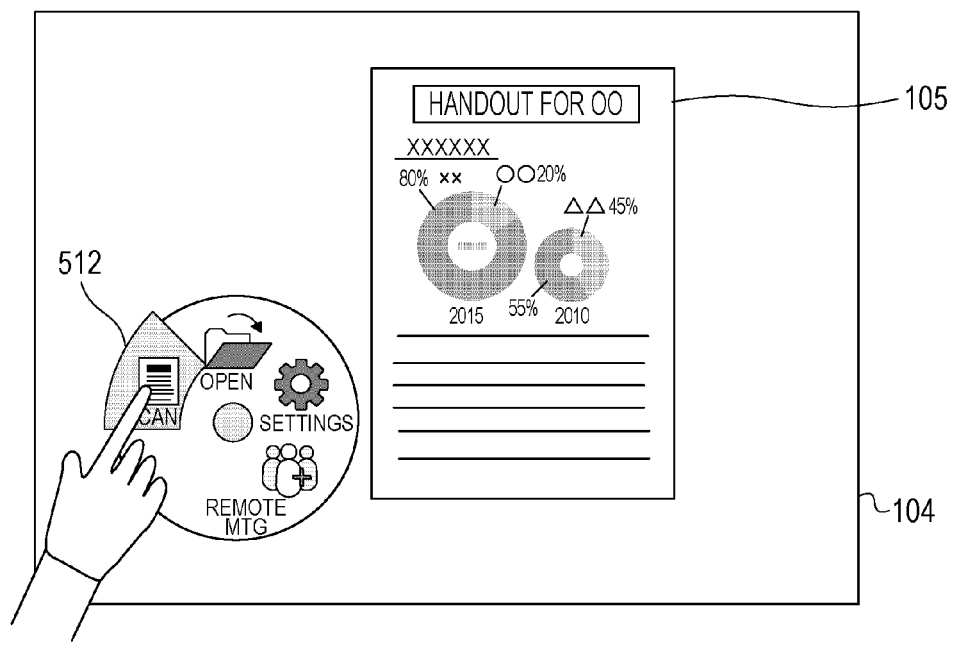
Figure 5C:
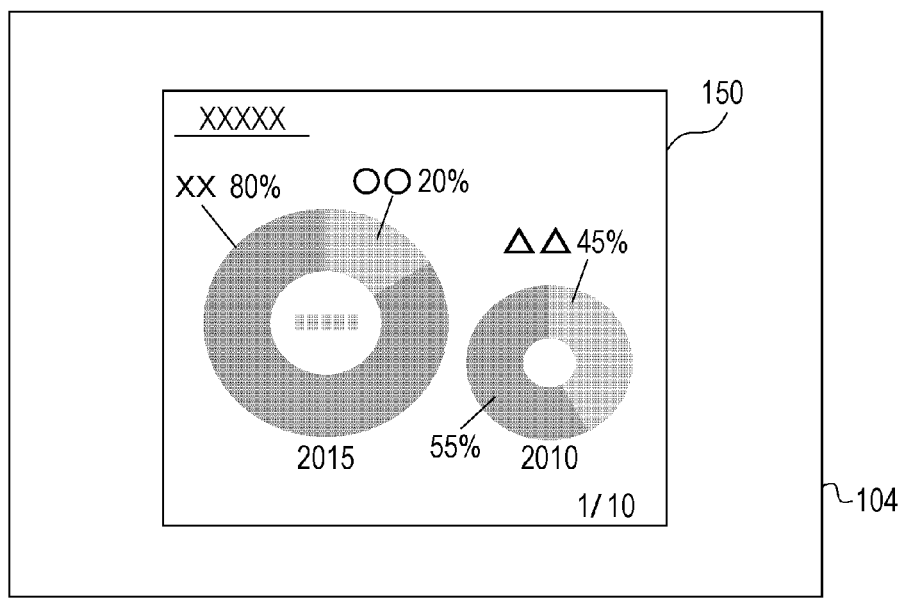

FIGS. 5A to 5C illustrate examples of an operation screen projected by the projector 203. FIG. 5A illustrates an operation screen 500 projected onto the projection area 104. Upon detecting, by using the touch pad 205, that a given position in the projection area 104 (for example, a touch position 501) is continuously pressed for a certain period of time, the CPU 402 displays the operation screen 500 so that the center of the operation screen 500 coincides with the coordinates of the touch position 501. The operation screen 500 has icons displayed therein, such as a scan button 502, a file button 503, a setting button 504, and a communication start button 505.

The user can select the scan button 502 and scan the object 105, such as a paper document, placed in the projection area 104. In addition, the user can select the file button 503 and display an electronic meeting material selected through a file selection screen (not illustrated). Furthermore, the user can select the settings button 504 and display a control screen (not illustrated). The user can perform calibration for aligning the coordinate systems of the camera 202, the depth sensor 204, and the projector 203 through the control screen. In addition, for example, the user can make settings relating to the exposure of the camera 202 and the depth sensor 204, settings relating to focus, settings relating to communication with a remote site through the control screen.

The user can select the communication start button 505 and communicate with an information processing apparatus connected over the network.

FIG. 5B illustrates an example of a user operation to instruct a scanning operation through a projected display screen. The user places the object 105 to be scanned in the projection area 104 and touches a desired position in the projection area to display the operation screen 500. Upon detecting that the scan button 502 is selected by the user, the CPU 402 displays selection notification information 512. For example, the selection notification information 512 may be a change in color of a certain area including the scan button 502. Subsequently, the user instructs a scanning operation by releasing the finger that has selected the scan button 502. A particular method for scanning the placed object 105 is described with reference to a flowchart described below.

FIG. 5C illustrates the case in which the user selects the file button 503 to display an electronic meeting material. When the file button 503 is selected by the user, the CPU 402 displays a meeting material selection screen (not illustrated). The user selects, from a meeting material selection screen (not illustrated), a meeting material to be displayed (for example, a presentation document). The selected electronic document 150 is displayed in the projection area 104 at a desired position with a desired size. The user can change the size of the displayed electronic document 150 by touching one of the four corners of the electronic document 150 and, thereafter, sliding the touch point. In addition, the user can change the display position of the electronic document 150 by touching any position other than the four corners of the electronic document 150 and, thereafter, sliding the touch point.

Setting of Remote Communication

Figure 6A:
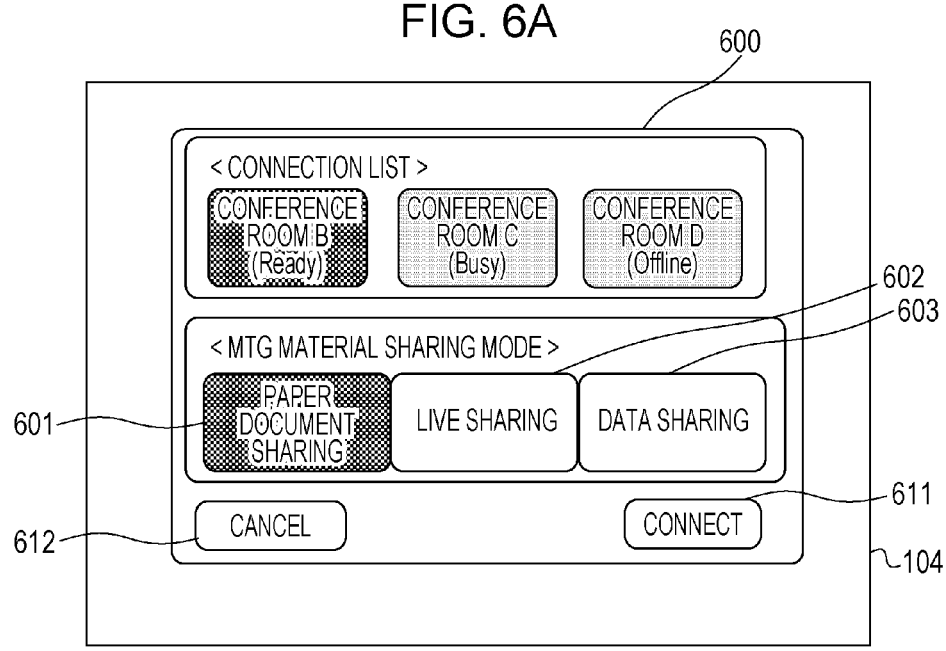
FIGS. 6A and 6B illustrate an example of operation screens projected onto a projection surface according to at least one exemplary embodiment of the present disclosure.
Figure 6B:
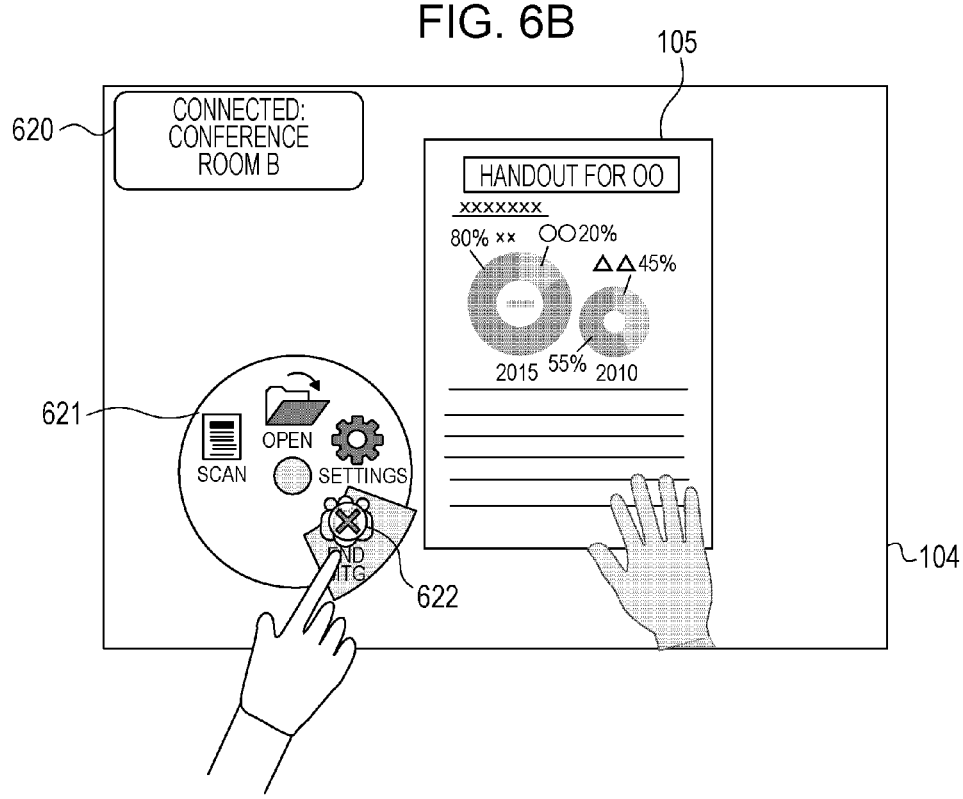

The remote communication method described with reference to FIGS. 1A, 1B, 2A and 2B is described in more detail below. FIGS. 6A and 6B illustrate examples of operation screens projected by the information processing apparatus 101 using the projector 203 in conference room A. FIG. 6A illustrates an example of a screen displayed when the communication start button 505 is selected by the user.

Through a setting screen 600, the user can specify the connection destination (also called a communication partner) with whom the user wants to perform remote communication and the operation mode during the remote communication. As illustrated in FIG. 6A, "Conference Room B", "Conference Room C", and "Conference Room D" are displayed to indicate the information processing apparatuses to be connected. Information as to whether connection is available is displayed under the names of the conference rooms. For example, the above information is displayed on the basis of a response to an inquiry made to the information processing apparatuses when the setting screen 600 is displayed. "Ready" indicating that the communication can be started is displayed as the information regarding conference room B. In addition, as the information regarding conference room C, "Busy" is displayed, which indicates that the information processing apparatus cannot respond since the information processing apparatus is communicating with another information processing apparatus or the user has set the status to a busy state. As the information regarding the information processing apparatus in conference room D, "Offline" indicating that communication cannot be started is displayed.

The user can select the button of one of the conference rooms listed and select the connection destination. In FIG. 6A, for example, conference room B is selected. Note that information required for connection with each of the conference rooms via the network (for example, the IP address) has been input from a setting screen (not illustrated) and has been stored in a predetermined area of the HDD 405.

In addition, to set the operation mode of remote communication, the user can switch between the material sharing modes through the setting screen 600. The user can select one of the operation modes by selecting the buttons 601 to 603. In FIG. 6A, for example, "paper document sharing" is selected as the material sharing mode. Note that operation mode information indicating the selected operation mode is stored in the RAM 403.

Each of the operation modes is described below. As illustrated in FIGS. 1A, 1B, 2A, and 2B, in the paper document sharing mode corresponding to the button 601, an object, such as paperwork, whose image is to be captured is placed, and the image captured by scanning the placed object is transmitted to a remote site and is projected to the projection surface at the remote site.

When the paper document sharing mode is selected, the information processing apparatus 101 transmits the scanned image and the information regarding the display position to the information processing apparatus at the remote site. The information processing apparatus at the remote site projects the scanned image received from the information processing apparatus 101 onto the projection area on the basis of the received information regarding the display position. Note that an object placed near the information processing apparatus at the remote site can be shared with the information processing apparatus 101. Furthermore, by generating scanned images of objects placed near the information processing apparatus 101 and the information processing apparatus at the remote site, transmitting the respective scanned images to the other apparatus, and projecting the scanned images, the objects placed in the conference rooms can be shared.

A live sharing mode corresponding to the button 602 is a mode for sharing an image including, for example, the gesture of a user in conference room A and or an image of writing an annotation on a document with a remote site in real time. For example, in remote communication in the live sharing mode, a user in conference room B at the remote site can view the action of the user (for example, writing an annotation on the document) in conference room A in real time. Furthermore, the user at the remote site can support the user in conference room A by pointing their hand or finger to the above-described image updated in real time and commenting with their voice.

When the live sharing mode is selected, the information processing apparatus 101 generates a live image and transmits the generated live image to an information processing apparatus at a remote site. The information processing apparatus at the remote site displays the received live image. Note that a live image may be generated by the information processing apparatus at a remote site, and the generated live image may be received and projected by the information processing apparatus 101.

The data sharing mode corresponding to the button 603 is a mode for sharing an electronic document with a remote site. In remote communication in the data sharing mode, an electronic document, such as a presentation document illustrated in FIG. 5C, can be shared with a remote site, and pointing motions of the users to the shared electronic document with their hands or fingers can be shared.

When the data sharing mode is selected, an electronic document stored in the HDD 405 or the external memory 413 of the information processing apparatus 101 can be shared with the remote site. In addition, an electronic document stored in the file server 102 connected via the network 400 can be shared with a remote site. The information processing apparatus 101 projects the electronic document selected by the user onto the projection area 104 and, at the same time, transmits the electronic document and the information regarding the display position of the electronic document to the information processing apparatus at the remote site. The information processing apparatus at the remote site projects the received electronic document onto the projection area on the basis of the information regarding the display position. In this manner, the electronic document is shared.

In addition, the user can start remote communication by selecting a connection button 611. Furthermore, the user can cancel execution of remote communication by selecting a cancel button 612.

FIG. 6B illustrates an image projected in conference room A during remote communication. In an area 620, information regarding the state of connection with a remote site is displayed. For example, information indicating the name of the conference room where the information processing apparatus currently communicating with the information processing apparatus 101 is located is displayed.

In addition, the user can display an operation screen 621 customized for communication by selecting a predetermined portion within the projection area 104 continuously for a certain period of time. Furthermore, the user can terminate the communication with the remote site by selecting a communication end button 622 displayed in the operation screen 621.

Hereinafter, the information processing apparatus that sends a request for starting remote communication in FIGS. 6A and 6B is referred to as a "host information processing apparatus", and the information processing apparatus that receives the request for starting remote communication is referred to as a "client information processing apparatus".

Control of Information Processing Apparatus

Figure 7:
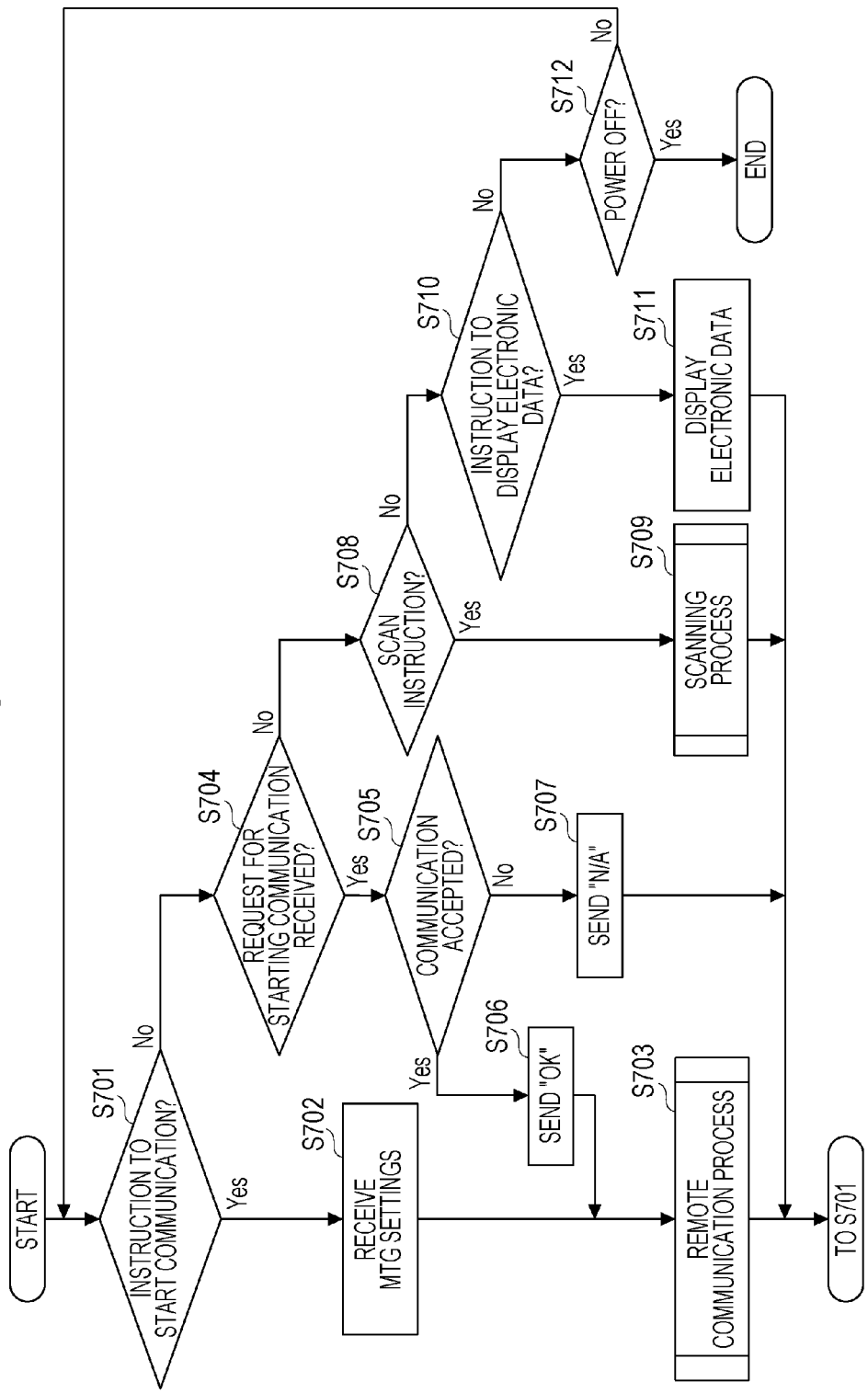
FIG. 7 is a flowchart illustrating an example of a method for controlling an information processing apparatus according to at least one exemplary embodiment of the present disclosure.

Subsequently, control performed by the information processing apparatus 101 is described with reference to FIGS. 7 and 8. FIGS. 7 and 8 are flowcharts illustrating control performed by the information processing apparatus 101. Each of operations (steps) illustrated in the flowcharts in FIGS. 7 and 8 is realized by the CPU 402 loading a control program stored in the ROM 404 or the HDD 405 onto the RAM 403 and executing the control program. Note that some of the processes illustrated in the flowcharts are realized by the above-described control program executed by the CPU 402, the controllers in the control unit 401, and the units connected to the control unit 401 in appropriate cooperation with one another. In addition, in the information processing apparatus 101b set in conference room B at a remote site, a CPU 402b performs similar control.

In step S701, the CPU 402 determines whether a communication start instruction has been received. Upon detecting selection of the communication start button 505, the CPU 402 determines that a communication start instruction has been received, and the processing proceeds to step S702. However, if selection of the communication start button 505 has not been detected, the CPU 402 determines that a communication start instruction has not been received, and the processing proceeds to step S704.

In step S702, the CPU 402 receives the settings related to remote communication. The user makes settings related to remote communication through, for example, the setting screen 600 illustrated in FIG. 6A. The settings related to remote communication received in step S702 is stored in the RAM 403 or the HDD 405 and are referenced in a subsequent step (described below). Upon detecting selection of the connection button performed by the user, the processing of the CPU 402 proceeds to step S703.

In step S703, the CPU 402 performs a remote communication process. The remote communication process is described below with reference to a flowchart. Upon completion of the remote communication process, the processing returns to step S701.

In step S704, the CPU 402 determines whether a request for starting communication has been received from an external apparatus. If a request for starting communication has been received from the external apparatus, the processing proceeds to step S705. However, if a request for starting communication has not been received from the external apparatus, the processing proceeds to step S708. For example, a request for starting communication is transmitted from another information processing apparatus connected via the network 400, such as the information processing apparatus 101b set in conference room B.

In step S705, the CPU 402 displays a reception screen (not illustrated) in the projection area 104 and inquires of the user whether to accept communication with the communication partner. If an instruction to accept communication with the communication partner is given by the user, the processing proceeds to step S706. However, if the user gives an instruction not to accept the communication, the processing proceeds to step S707.

In step S706, the CPU 402 transmits "OK" as a response to the external apparatus that has transmitted the request to start communication. Thereafter, the processing proceeds to step S703, where the remote communication process is performed. In S707, the CPU 402 transmits "N/A" as a response to the external apparatus that has transmitted the request for starting communication. Thereafter, the processing returns to step S701.

In step S708, the CPU 402 determines whether a scan instruction has been received. If selection of the scan button 502 is detected, the CPU 402 determines that the scan instruction has been received, and the processing proceeds to step S709. However, if selection of the scan button 502 has not been detected, the CPU 402 determines that the scan instruction has not been received, and the processing proceeds to step S710.

In step S709, the CPU 402 performs a scanning process to scan the object, such as a paper document, placed in the projection area 104 in cooperation with the camera 202. The scanning process is described in more detail below. Upon completion of the scanning process, the processing returns to step S701.

In step S710, the CPU 402 determines whether a display instruction to display the electronic document has been received. If selection of the file button 503 is detected, the CPU 402 displays a document selection screen (not illustrated). Upon detecting, through the document selection screen, selection of a document (for example, a presentation document) to be displayed (not illustrated), the CPU 402 determines that a display instruction to display an electronic document has been received and, thus, the processing proceeds to step S711. However, if selection of the file button 503 has not been detected, the CPU 402 determines that a display instruction to display an electronic document has not been received and, thus, the processing proceeds to step S712.

In step S711, the CPU 402 projects, onto the projection surface 103, the electronic document based on the electronic document display instruction received in step S710 in cooperation with the projector 203.

In step S712, the CPU 402 determines whether a power-off instruction has been received. If a power-off instruction has been received, shutdown processing of the information processing apparatus is performed. Thus, a series of processes ends. However, if a power-off instruction has not been received, the processing returns to step S701.

Control of Scanning Process

The scanning process is described below with reference to a flowchart illustrated in FIG. 8 and illustrations in FIGS. 9A to 9F. FIGS. 9A to 9F illustrate the scanning process performed by the information processing apparatus.

Figure 9A:
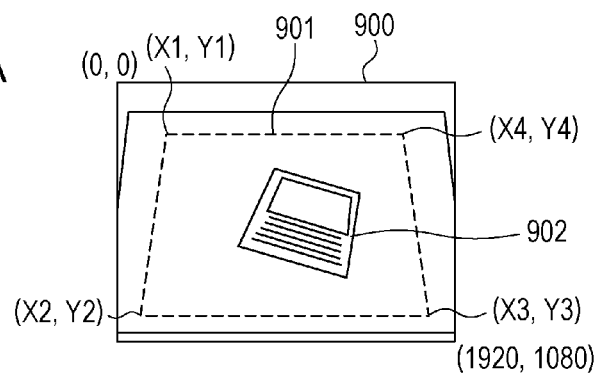
FIGS. 9A to 9F illustrate an example of the scanning process of an object according to at least one exemplary embodiment of the present disclosure.

In step S801, the CPU 402 controls the camera 202 to acquire a camera image. FIG. 9A illustrates a camera image 900 acquired in step S801. The camera 202 captures the image of an area including the projection area 104 and acquires a camera image of 1920 dots×1080 dots. The camera image 900 acquired by the camera 202 includes an image 902 which is the image of an object placed in the projection area 104. The coordinate system of the camera 202 does not directly face the projection area 104. Accordingly, the image 902 of the object in the camera image 900 is distorted in a trapezoidal shape.

An area 901 indicated by a broken line in FIG. 9A corresponds to the projection area 104 in the camera image 900. Note that the area corresponding to the projection area 104 in the camera image 900 is calculated through a calibration process performed in advance. In this example, for the purpose of description, the areas corresponding to the projection area 104 in the camera image 900 is calculated through a calibration process performed in advance so as to be defined by the coordinates (X1, Y1), (X2, Y2), (X3, Y3), and (X4, Y4).

Figure 9B:
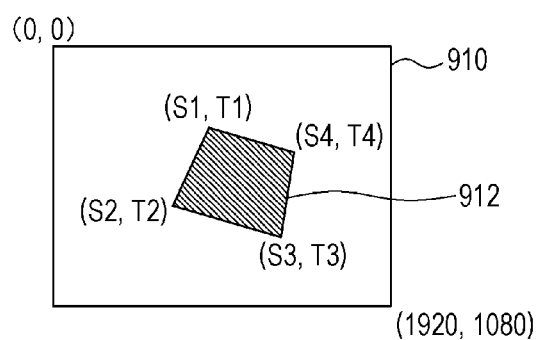

In step S802, the CPU 402 generates a mask image indicating the difference between a reference image and the camera image 900 acquired in step S801 for each of pixels. The reference image is acquired in advance when the object acquired in advance through calibration process is not present. More specifically, the CPU 402 binarizes a pixel having a difference greater than or equal to a predetermined value from the pixel of the reference image to black (pixel value 255) and a pixel having a difference less than the predetermined value to white (pixel value 0). In this manner, the CPU 402 generates the mask image. FIG. 9B illustrates the mask image generated in step S802. As illustrated in FIG. 9B, a mask image 910 is generated in step S802 by extracting the area of the image 902 illustrated in FIG. 9A as a difference area 912.

In step S803, the CPU 402 calculates the coordinates of each of the vertexes of the difference area 912. More specifically, rectangle approximation is applied to the edges extracted by performing an edge extraction process, and the coordinates of four sides that form the difference area 912 are acquired. For the purpose of description, it is assumed that the coordinates of the vertexes of the difference area 912 are calculated in the process in step S803 so as to be (S1, T1), (S2, T2), (S3, T3), and (S4, T4) as illustrated in FIG. 9B.

Figure 9C:
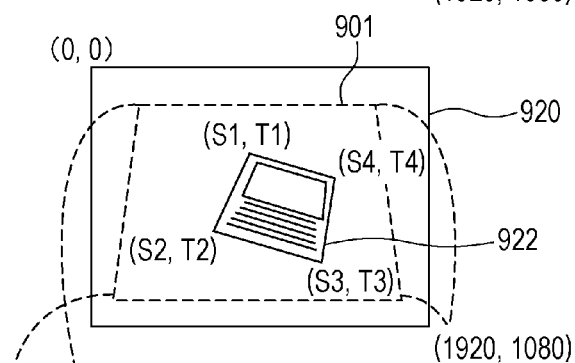

In step S804, the CPU 402 adds the pixels of the camera image obtained in step S801 to the mask image obtained in step S802 by using the logical AND operation and generates an extraction image of the portion of the object. FIG. 9C illustrates the extraction image generated in step S804. As illustrated in FIG. 9C, an extraction image 920 generated in step S804 is an image in which the image 922 indicating the object is extracted.

Figure 9D:
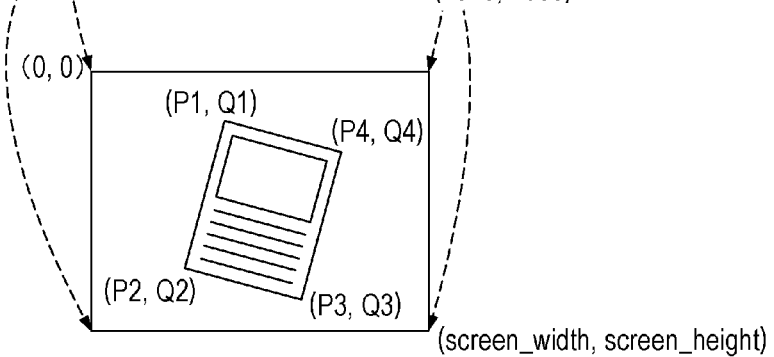

In step S805, the CPU 402 performs tone correction on the extraction image. In step S806, the CPU 402 applies a projective transform to the image of the area corresponding to the projection area 104 in the extraction image to obtain the image in the projected coordinate system. FIG. 9D illustrates a projective transform into the projected coordinate system. Projective transform is applied so that the coordinates (X1, Y1) acquired by the calibration process performed in advance are changed to the coordinates (0, 0) of the projection image and the coordinates (X2, Y2) are changed to the coordinates (0, screen height) of the projection image. In addition, projective transform is applied so that the coordinates (X3, Y3) are changed to the coordinates (screen width, screen height) of the projection image and the coordinates (X4, Y4) are changed to the coordinates (screen width, 0) of the projection image. Through the process performed in step S805, the image of the area corresponding to the projection area 104 indicated by the broken line 901 in FIG. 9C can be transformed into the image projected into the projected coordinate system by the projector 203. Thus, as illustrated in FIG. 9D, the area corresponding to the projection area can be converted into the image in the projection coordinate system.

Subsequently, in step S807, the CPU 402 converts the coordinates of the vertexes of the object in the camera image system acquired in step S803 into the coordinates in the projected coordinate system. As illustrated in FIG. 9D, projective transform is applied to the coordinates (S1, T1), (S2, T2), (S3, T3), and (S4, T4) and obtains the coordinates (P1, Q1), (P2, Q2), (P3, Q3), and (P4, Q4) indicating the vertexes of the object in the projected coordinate system.

Figure 9E:
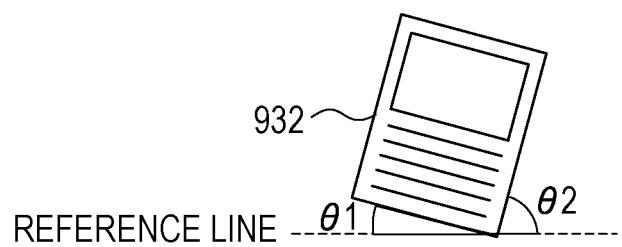

In step S808, the CPU 402 obtains the rotation angle of the image. FIG. 9E illustrates the rotation angle of the image. As illustrated in FIG. 9E, the CPU 402 defines a reference line by using, as a reference, any one of the vertexes of an image 932 obtained by projective transform. Subsequently, the CPU 402 calculates inclinations θ1 and θ2 indicating how much the image 932 rotates from the reference line, and the smaller one of the inclinations (θ1 in this example) is selected as the rotation angle of the image 932 of the object after the projective transform.

Figure 9F:
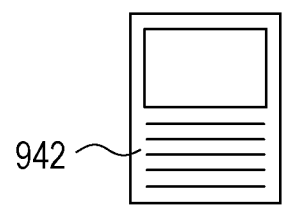
Figure 10:
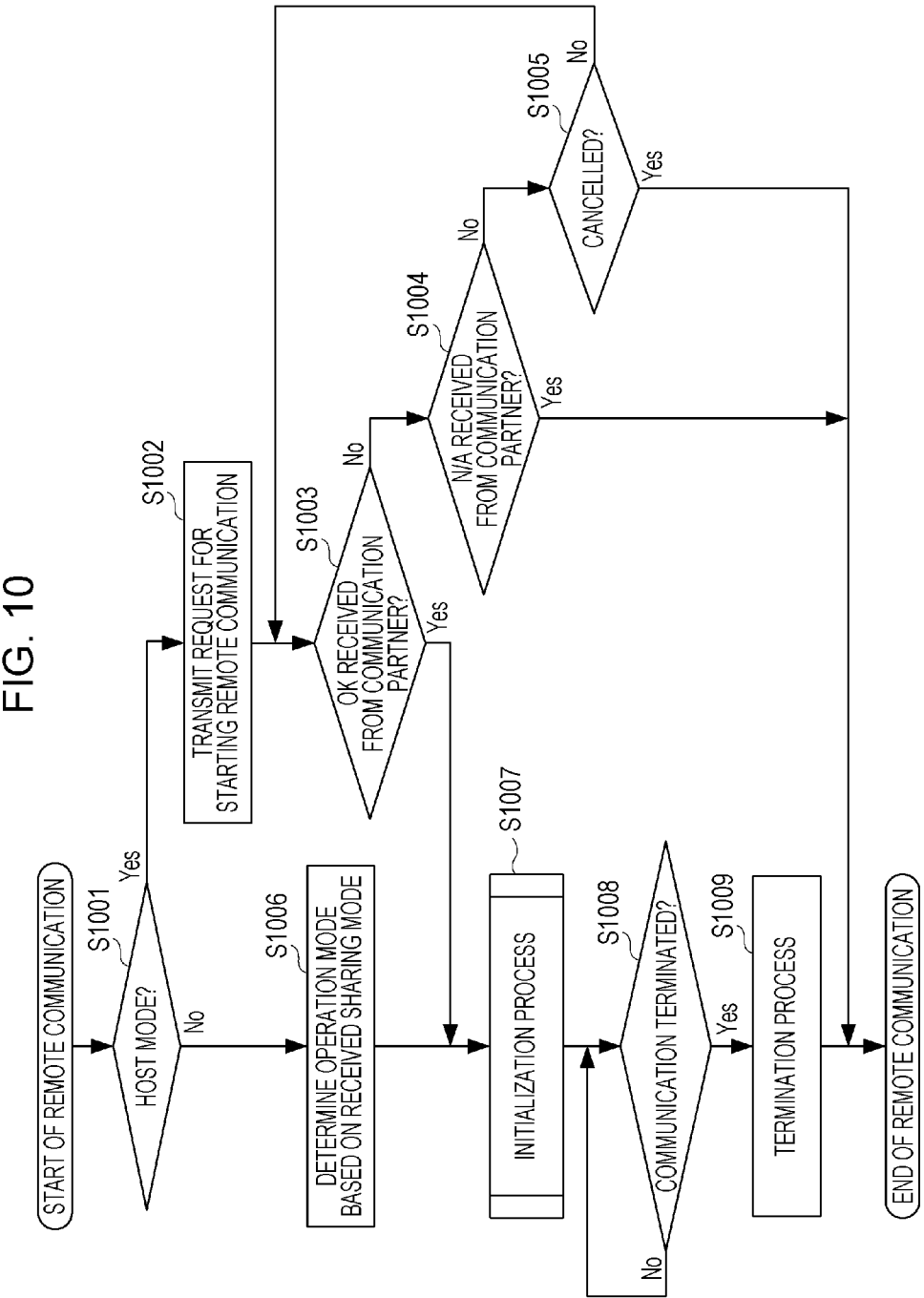
FIG. 10 is a flowchart related to an example of communication processing according to at least one exemplary embodiment of the present disclosure.

In step S809, the CPU 402 rotates the image on the basis of the rotation angle obtained in step S808 and generates a scanned image having the corrected inclination. FIG. 9F illustrates the scanned image which has the corrected inclination and which is generated in step S809. As illustrated in FIG. 9F, by rotating the image 932 counterclockwise by the angle θ1, an image 942 having the corrected inclination can be generated.

In S810, the CPU 402 performs a compression process on the scanned image 942 and converts the format. For example, the image data is converted into a file such as Portable Document Format (PDF) or Joint Photographic Coding Experts Group (JPEG). At this time, an optical character recognition (OCR) process may be performed on the image, and the result of OCR may be reflected in the file.

In S811, the CPU 402 determines whether layout information is necessary. If the CPU 402 receives a scan instruction while a remote communication process (described below) is being performed, the CPU 402 determines that the layout information is necessary. Consequently, the processing proceeds to step S812. However, if a scan instruction is received while a remote communication processing is not being performed, the CPU 402 determines that the layout information is not necessary. Consequently, the processing proceeds to step S813.

In S812, the CPU 402 associates the coordinates of the object acquired in step S807 and the rotation angle of the object acquired in step S808 (the layout information) with the file generated in step S810 and stores the layout information and the file in the HDD 405. In this manner, a series of processes are completed. Note that the layout information used in step S812 is necessary for reproducing the projection position and the posture (the inclination) of the document at the time of projecting the document by using the projector. The layout information is referenced as needed in a flowchart described below.

In step S813, the CPU 402 stores, in the HDD 405, the file obtained in step S810. Thus, the series of processes is completed.

Control of Remote Communication Process

The control of the remote communication process performed in step S703 is described below with reference to the flowcharts illustrated in FIGS. 10, 11, 12A, 12B, 13A and 13B and FIGS. 15A, 15B, 16A, 16B, 17A and 17B.

The operations (steps) illustrated in the flowcharts illustrated in FIGS. 10, 11, 12A, 12B, 13A and 13B and FIGS. 15A, 15B, 16A, 16B, 17A and 17B are realized by the CPU 402 loading the control program stored in the ROM 404 or the HDD 405 onto the RAM 403 and executing the loaded control program. Note that some of the processes illustrated in the flowcharts are realized by the above-described control program executed by the CPU 402, the controllers in the control unit 401, and the units connected to the control unit 401 in appropriate cooperation with one another. In addition, in the information processing apparatus 101b set in conference room B at a remote site, the CPU 402b performs similar control.

In step S1001, the CPU 402 determines whether the CPU 402 functions as a host information processing apparatus. If the CPU 402 functions as a host information processing apparatus, the processing proceeds to step S1002. However, if the CPU 402 does not function as a host information processing apparatus (that is, the CPU 402 functions as a client information processing apparatus), the processing proceeds to step S1006, where the CPU 402 determines the operation mode on the basis of operation mode information included in the communication start request received in step S704. Thereafter, the processing proceeds to step S1007.

In step S1002, the CPU 402 sends a request for starting remote communication to the connection destination received in step S702. The request sent to the communication partner in step S1002 contains the information regarding the operation mode indicating a scheme for sharing a document.

In step S1003, the CPU 402 determines whether "OK" has been received from the communication partner. If "OK" has been received from the communication partner, the processing proceeds to step S1007. However, if "OK" has not been received from the communication partner, the processing proceeds to step S1004. In step S1004, the CPU 402 determines whether "N/A" has been received from the communication partner. If "N/A" has been received from the communication partner, the series of remote communication processes is terminated. Thereafter, the processing returns to step S701. However, if "N/A" has not been received from the communication partner, the processing proceeds to step S1005.

In step S1005, the CPU 402 determines whether to cancel the remote communication. If an instruction to cancel the remote communication has been received, the processing returns to step S701. However, if an instruction to cancel the remote communication has not been received, the processing returns to step S1003, where the CPU 402 waits for a response from the communication partner.

In step S1007, the CPU 402 initializes a loop of processes that are repeatedly executed during the remote communication process. In S1007, a thread activation process is performed to generate and transmit the gesture image described with reference to FIGS. 1A, 1B, 2A, and 2B to a remote site or receive and display a gesture image from the remote site. In addition, a thread activation process is performed to transmit data to a remote site or receive data from the remote site and display the received data in the projection area. The process performed in step S1007 is described below with reference to the flowchart illustrated in FIG. 11.

In step S1008, the CPU 402 determines whether an instruction to terminate communication has been received. If an instruction to terminate communication has been received, the processing proceeds to step S1009. However, if an instruction to terminate communication has not been received, the CPU 402 waits for input of an instruction to terminate the communication.

In S1009, the CPU 402 terminates the threads activated in step S1007 and terminates the remote communication.

The initialization process performed in step S1008 is described below. In step S1101, the CPU 402 generates a gesture image and activates a thread for transmitting the gesture image to the communication partner. In step S1102, the CPU 402 activates a thread for receiving a gesture image from the communication partner. Note that the loop processing related to transmission of a gesture image and the loop processing related to reception of a gesture image are described below with reference to the flowcharts illustrated in FIGS. 12A, 12B, 13A and 13B and illustrations in FIGS. 14A to 14E.

In step S1103, the CPU 402 determines whether the operation mode is the paper document sharing mode. If the operation mode is the paper document sharing mode, the processing proceeds to step S1104. However, if the operation mode is not the paper document sharing mode, the processing proceeds to step S1106.

In step S1104, the CPU 402 activates a thread for transmitting the scanned image. In step S1105, the CPU 402 activates a thread for receiving an image scanned at the remote site. The loop processing related to transmission of a scanned image and the loop processing related to reception of a scanned image are described below with reference to the flowchart illustrated in FIGS. 15A and 15B.

In step S1106, the CPU 402 determines whether the operation mode is the electronic document sharing mode. If the operation mode is the electronic document sharing mode, the processing proceeds to step S1107. If the operation mode is not the electronic document sharing mode, the processing proceeds to step S1109.

In S1107, the CPU 402 activates a thread for transmitting an electronic document. In step S1108, the CPU 402 activates a thread for receiving an electronic document from the remote site. The loop processing related to transmission of an electronic document and the loop processing related to reception of an electronic document are described below with reference to the flowchart illustrated in FIGS. 16A and 16B.

In step S1109, the CPU 402 activates a thread for transmitting a live image. In 51110, the CPU 402 activates a thread for receiving a live image. The loop processing related to transmission of a live image and the loop processing related to reception of a live image are described below with reference to the flowchart illustrated in FIGS. 17A and 17B and the illustration in FIGS. 18A and 18B.

Transmission and Reception Process of Gesture Image

Figure 11:
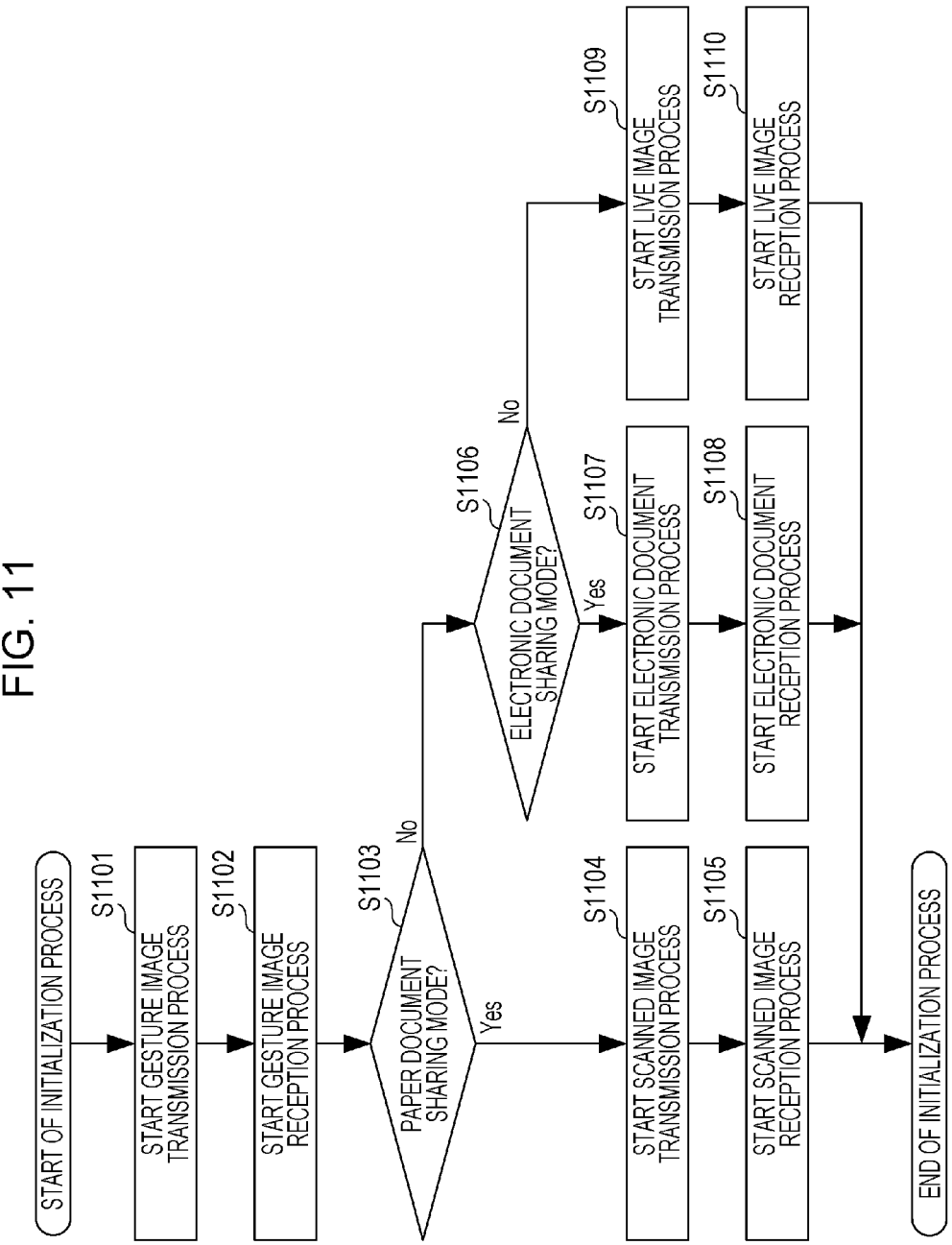
FIG. 11 is a flowchart related to an example of communication processing according to at least one exemplary embodiment of the present disclosure.
Figure 12A:
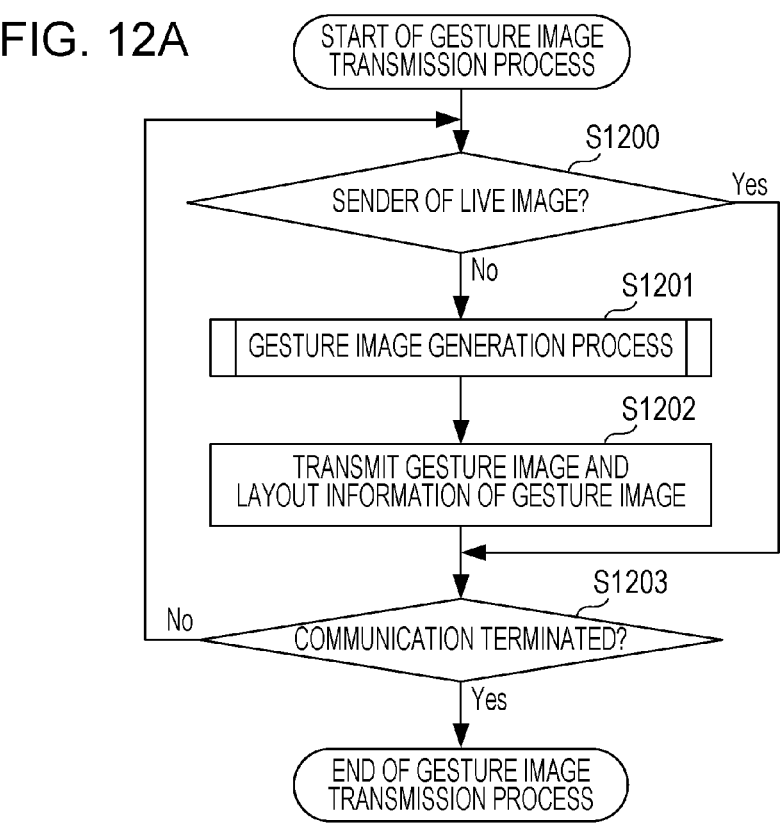
FIGS. 12A and 12B are flowcharts related to an example of the transmission and reception processes of a gesture image of a person according to at least one exemplary embodiment of the present disclosure.
Figure 12B:
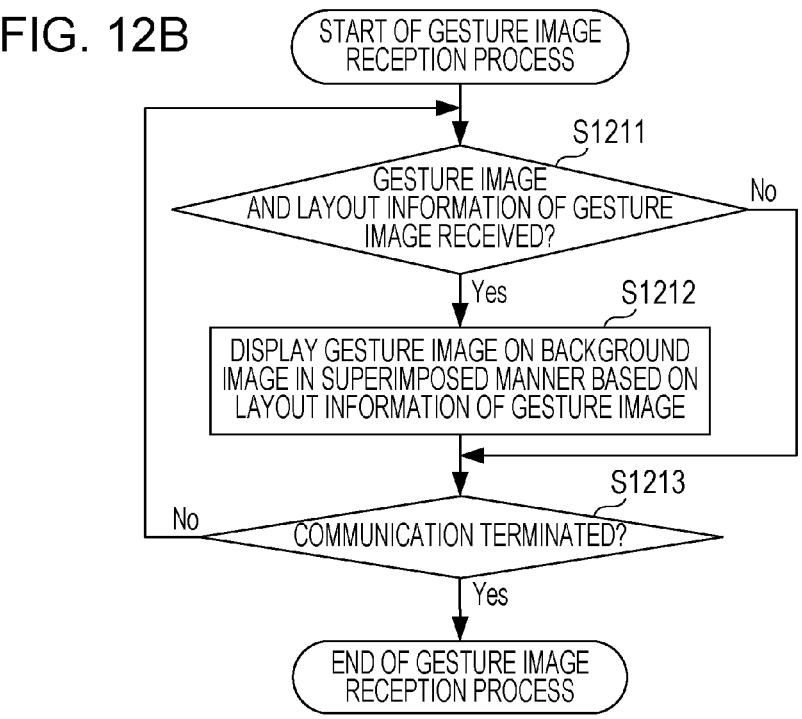

The loop processing performed by the threads activated in steps illustrated in FIG. 11 is described below. FIG. 12A is a flowchart illustrating the loop processing related to transmission of a gesture image, and FIG. 12B is a flowchart illustrating the loop processing related to reception of a gesture image.

The loop processing related to transmission of a gesture image is described first. In step S1200, the CPU 402 determines whether the CPU 402 is a sender of a live image. When the operation mode shared with the communication partner is a live sharing mode and if the CPU 402 serves as a host which transmits a live image to the communication partner, the CPU 402 determines that the CPU 402 is the sender of a live image. Thus, the processing proceeds to step S1203. However, if the operation mode is not a live sharing mode or if the operation mode is a live sharing mode and the CPU 402 serves as a client which receives a live image from the communication partner, the CPU 402 determines that the CPU 402 is not the sender of a live image. Thus, the processing proceeds to step S1201. By performing such processing, generation and transmission of a gesture image can be removed when a live image including a gesture is transmitted.

In step S1201, the CPU 402 performs a gesture image generation process in cooperation with the depth sensor 204. The gesture image generation process is described below with reference to the flowcharts illustrated in FIGS. 13A and 13B and the illustrations in FIGS. 14A to 14E.

According to the present exemplary embodiment, the CPU 402 can acquire the range image and the RGB camera image generated by the depth sensor 204 at 24 FPS (Frames per second). In addition, according to the present exemplary embodiment, the CPU 402 generates a gesture image for each of frames. However, the present exemplary embodiment is not limited thereto. For example, a gesture image may be generated for every N frames or for every N seconds as needed in accordance with the processing powers of the CPU 402 and the depth sensor 204 and the load imposed on the network 400.

Figure 14A:
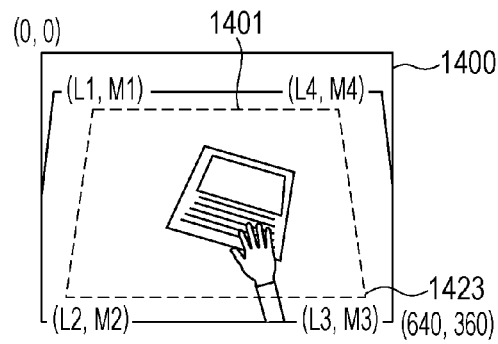
FIGS. 14A to 14E illustrate an example of generation of a gesture image according to at least one exemplary embodiment of the present disclosure.

In step S1301, the CPU 402 controls the depth sensor 204 to acquire an RGB image. FIG. 14A illustrates an RGB image 1400 acquired by the depth sensor. According to the present exemplary embodiment, the depth sensor captures the image of the area including the projection region 104. In addition, the size of the image is 640 dots×360 dots. In FIG. 14A, an area enclosed by a broken line 1401 corresponds to the projection area 104 in the RGB image 1400. The RGB camera 417 is disposed so as not to capture the image of the projection area 104 from a predetermined angle. Accordingly, the image of the area corresponding to the projection area 104 is distorted into a trapezoidal shape and is captured. Note that the area corresponding to the projection area 104 in the RGB image is calculated through a calibration process performed in advance. For ease of description, the area corresponding to the projection area 104 in the RGB image 1400 is calculated through the calibration process performed in advance so as to be defined by the coordinates (L1, M1), (L2, M2), (L3, M3), and (L4, M4).

In step S1302, the CPU 402 controls the depth sensor 204 to acquire a range image. For example, according to the present exemplary embodiment, a range image acquired by the depth sensor 204 has a size of 640 dots×360 dots. The range image acquired in step S1302 is generated by the controller 414 of the depth sensor 204 which operates in accordance with the flowchart illustrated in FIG. 13B.

Figure 13A:
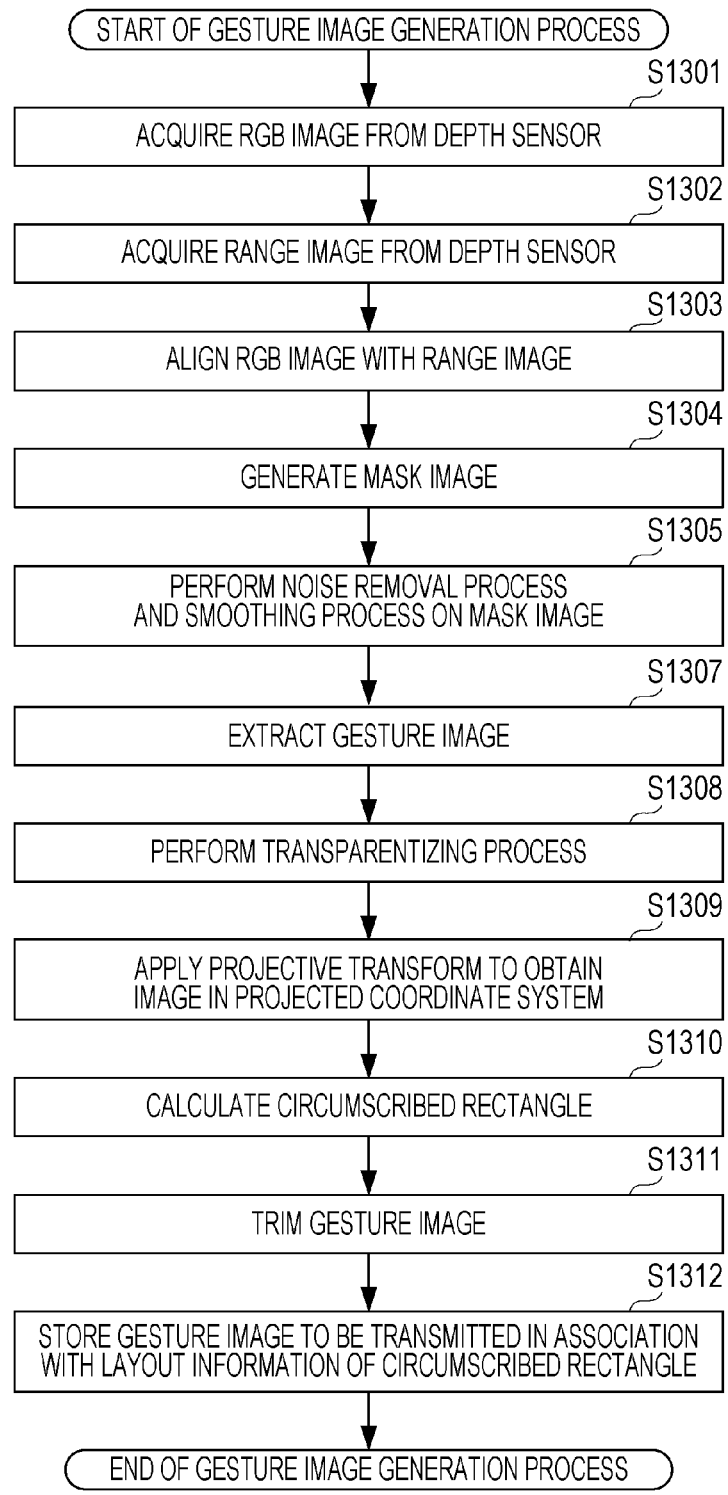
FIGS. 13A and 13B are flowcharts related to an example of generation of a gesture image of a person according to at least one exemplary embodiment of the present disclosure.
Figure 13B:
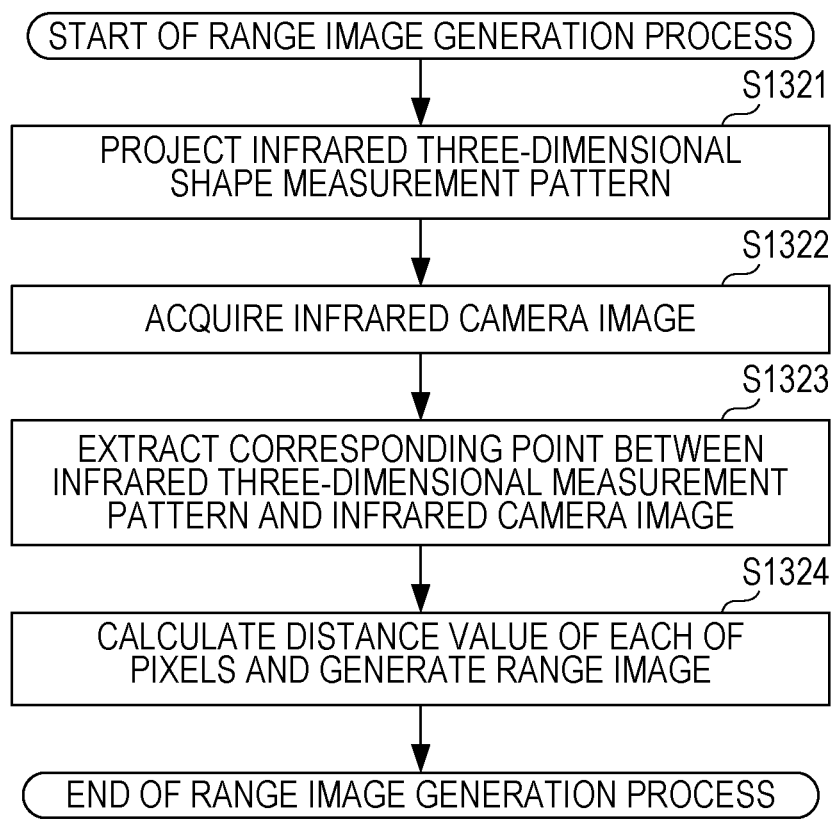

As illustrated in FIG. 13B, in step S1321, the controller 414 controls the infrared ray projection unit 415 to project a three-dimensional shape measurement pattern toward the projection surface 103 by using an infrared ray. In step S1322, the controller 414 acquires an infrared camera image including 8-bit single-channel information by capturing, with the infrared camera 416, the image of the three-dimensional shape measurement pattern projected toward the projection surface 103 in step S1321.

In S1323, the CPU 402 extracts the corresponding point between the three-dimensional measurement pattern projected in step S1321 and the infrared camera image acquired in step S1322. For example, a given point on the infrared camera image is searched for in the three-dimensional shape measurement pattern. If the same point is detected, the points are associated with each other. Alternatively, a pattern having a predetermined size and including the surrounding area of a given pixel of the infrared camera image may be searched for in the three-dimensional shape measurement pattern. Thereafter, a portion having the highest similarity may be associated with the pattern. To facilitate the association process, the three-dimensional shape measurement pattern is configured such that any one of the portions differs from the other portions. In this manner, it can be identified which one of all the portions of the pattern is similar to a given portion of the pattern by using pattern matching. In addition, when a three-dimensional shape measurement pattern is projected onto a three-dimensional shape, such as the hand or the finger, the pattern obtained by capturing the image of the three-dimensional shape measurement pattern may be greatly distorted. In this case, it may be difficult to associate the captured image pattern with the original pattern. Accordingly, it is desirable that the three-dimensional shape measurement pattern be a high-density pattern so that from a portion of the pattern projected onto a very narrow range that can be approximated by a flat surface, the position of the portion in the entire pattern can be identified.

In step S1324, the CPU 402 calculates the distance from the infrared camera 416 by performing calculation based on the principle of triangulation by using the straight line extending from the infrared ray projection unit 415 to the infrared camera 416 as a baseline. For the pixels that can be associated in step S1323, the distance from the infrared camera 416 is calculated and stored in the form of a pixel value. For the pixels that cannot be associated, an invalid value indicating that the distance is not measurable (For example, −1) is stored. This process is performed on all of the pixels of the infrared camera image, so that a range image composed of 8-bit single-channel information in which each pixel has the distance value is generated. Note that to calculate the distance from the infrared camera 416, it is necessary to know the positional relationship between the infrared camera 416 and the infrared pattern projection unit 321 and the respective internal parameters. Such information is calculated through the calibration process performed in advance. Note that the process in step S1324 is performed by an ASIC (not illustrated) or a digital signal processor (DSP) provided in the controller 414.

While the present exemplary embodiment has been described with reference to a technique of the depth sensor 204 in which an infrared pattern is projected to detect the distance to the object. However, the technique is not limited thereto. Different techniques may be employed. For example, a stereo system that uses two RGB cameras for stereoscopic viewing may be employed. Alternatively, Time Of Flight (TOF) may be employed. In TOF, a time period until the infrared ray is reflected by the object is calculated from the phase difference between the projection infrared ray and the reflected ray, and the distance to the object is detected.

Referring back to FIG. 13A, in step S1303, the CPU 402 aligns the positions of the range image with the RGB image in cooperation with the depth sensor 204.

This process is performed to make the physical positions of the pixels of the range image captured by the infrared camera 416 to be the same as the positions of the corresponding pixels of the RGB image in the image capturing range captured by the RGB camera 417 located at positions different from the positions of the infrared camera 416. More specifically, the CPU 402 converts each of the pixels of the range image captured by the infrared camera 416 into the coordinates of the pixel in the RGB camera 417 so that the position of each of the pixels, which indicates the distance obtained from the infrared camera image, matches the coordinates of the pixel in the coordinate system of the RGB camera image. Note that the relative positional relationship between the infrared camera 416 and the RGB camera 417 and the internal parameters for conversion are already known through the calibration process performed in advance.

Figure 14B:
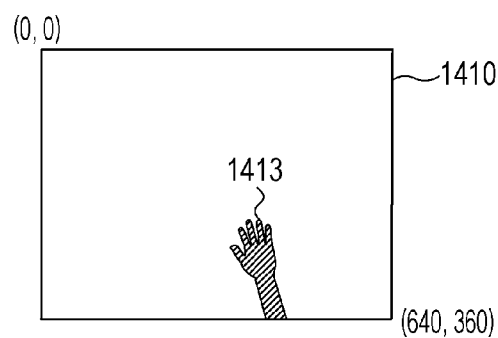

In step S1304, the CPU 402 generates a mask image based on the difference between each of the pixels of the reference range image that does not include the image of the hand of the user and that is acquired in advance through the calibration process and a corresponding one of the pixels of the range image. According to the present exemplary embodiment, to detect the hand held over the projection area 104, the depth sensor 204 is configured to be capable of acquiring a three-dimensional shape in the range d1 having a height of, for example, up to 100 mm from the projection surface 103 (a height of 0 mm). The CPU 402 changes the values of pixels included in the range d1 to 255 and the values of the other pixels to 0 and generates a mask image. FIG. 14B illustrates a mask image. As illustrated in FIG. 14B, in a mask image 1410 generated in step S1304, the values of the pixels in an area 1413 indicating the hand of the user are set to 255, and the values of the pixels in the other area are set to 0.

In step S1305, the CPU 402 performs image processing for removing noise and applying smoothing to the mask image obtained in step S1304. For example, to reduce noise, the CPU 402 performs an erosion process or a dilation process. In the erosion process, if there is even one pixel having a value of 0 around a pixel of interest, the value of the pixel of interest is changed to 0. In the dilation process, if there is even one pixel having a value of 255 around a pixel of interest, the value of the pixel of interest is changed to 255. In addition, the CPU 402 performs image processing using a smoothing filter (for example, a Gaussian filter), so that the outlines in the mask image is smoothened.

In step S1307, the CPU 402 adds the pixels of the RGB image obtained in step S1301 to the mask image subjected to image processing in step S1305 by using a logical AND operation and generates a gesture image that extracts the gesture of the user.

Figure 14C:
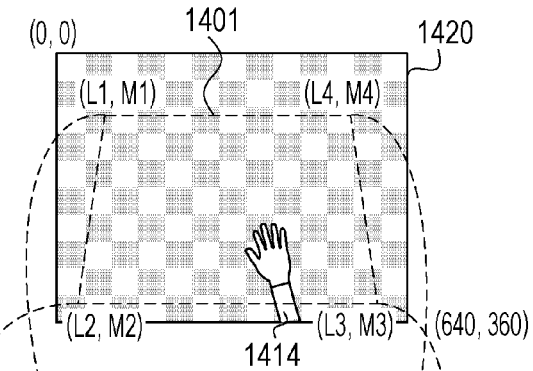

In step S1308, the CPU 402 performs a transparentizing process on the gesture image obtained in step S1307. The CPU 402 generates a multivalued image in which a pixel having a value of 255 is made non-transparent and a pixel having a value of 0 is made transparent. Through such processing, a gesture image 1420 illustrated in FIG. 14C is obtained. The gesture image 1420 has an area 1414 which is converted into a non-transparent area and the other area which is converted into a transparent area. For example, the gesture image 1420 is an 8-bit 4-channel image having four values (i.e., R, G, B, and the degree of transparency (also referred to as an "alpha value")) per pixel.

Figure 14D:
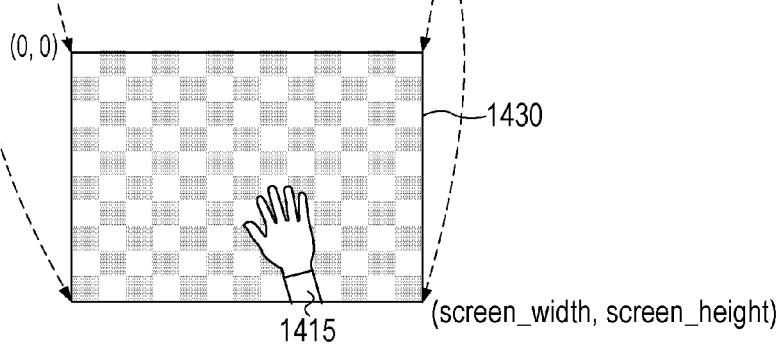

In step S1309, the CPU 402 applies a projective transform to the image of the area corresponding to the projection area 104 in the gesture image obtained in step S1308 to obtain an image in the projection coordinate system. FIG. 14D illustrates the projective transform that transforms an image into an image in the projected coordinate system. A projective transform is applied so that the coordinates (L1, M1) acquired in step S803 are mapped to the coordinates (0, 0) of the projection image and the coordinates (L2, M2) are mapped to the coordinates (0, screen height) of the projection image. In addition, a projective transform is applied so that the coordinates (L3, M3) are mapped to the coordinates (screen width, screen height) of the projection image and the coordinates (L4, M4) are mapped to the coordinates (screen width, 0) of the projection image. Through the processing in step S1309, the image in the area corresponding to the projection area 104 enclosed by the broken line 1401 in FIG. 14C can be transformed into an image 1430 in the projected coordinate system projected by the projector 203. Accordingly, as illustrated in FIG. 14D, an image 1430 in the projected coordinate system can be generated by transforming the area corresponding to the projection area in the RGB camera image. Note that the parameters required for projective transform are acquired through the calibration process performed in advance.

Figure 14E:
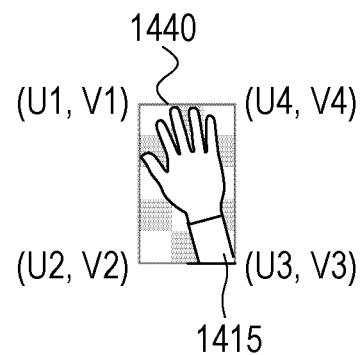

Subsequently, in step S1310, the CPU 402 acquires the coordinates of a rectangle which is circumscribed around an area 1415 of a gesture image 1440. As illustrated in FIG. 14E, the coordinates of the rectangle which is circumscribed around the area 1415 are coordinates (U1, V1), coordinates (U2, V2), coordinates (U3, V3), and coordinates (U4, V4). Note that if, in the process in step S1310, a plurality of areas of the gesture images are detected, the coordinates of a plurality of rectangles each circumscribed around one of the plurality of gesture images are calculated.

In step S1311, the CPU 402 generates a gesture image to be transmitted on the basis of the coordinates of the circumscribed rectangle obtained in step S1310. As illustrated in FIG. 14D, an area circumscribed around the gesture area 1415 is trimmed from the image 1430. Thus, the gesture image 1440 to be transmitted to the communication partner is obtained. Note that if a plurality of areas of gesture images are detected, the CPU 402 retrieves rectangles each circumscribed around one of the gesture images in the process performed in step S1311. Thus, the CPU 402 obtains a plurality of gesture images to be transmitted.

In step S1312, the CPU 402 associates the gesture image generated in step S1311 with the layout information based on the coordinates of the vertexes acquired in step S1310 and stores the gesture image and the layout information in the RAM 403. If the area of the gesture image is not detected in the process performed in step S1310, the CPU 402 stores, in the RAM 403, information indicating that a gesture is not detected instead of storing the gesture image and the layout information.

Through the series of processes described above, the CPU 402 can generate the gesture image to be transmitted to the communication partner and the layout information to be used by the communication partner when arranging the gesture image.

Referring back to FIGS. 12A and 12B, the loop processing related to transmission of the gesture image is described. In step S1202, the CPU 402 transmits, to the information processing apparatus of the communication partner, the gesture image and the layout information of the gesture image generated through the process of step S1201. If the information indicating that a gesture is not detected is stored in the RAM 403, the CPU 402 transmits information indicating that there is no gesture to the information processing apparatus of the communication partner.

In step S1203, the CPU 402 determines whether an instruction to terminate the remote communication has been received. If an instruction to terminate the remote communication has been received, the processing proceeds to step S1009, where the termination process is performed. However, if an instruction to terminate the remote communication has not been received, the processing returns to step S1200, and the loop processing related to transmission of a gesture image is continued.

The loop processing related to reception of a gesture image transmitted from an information processing apparatus at a remote site is described below with reference to FIG. 12B. In step S1211, the CPU 402 determines whether a gesture image and the layout of the gesture image have been received from an information processing apparatus at the remote site. If a gesture image and the layout of the gesture image have been received from the remote site, the processing proceeds to step S1212. However, if a gesture image and the layout of the gesture image have not been received from the remote site, the processing proceeds to step S1213.

In step S1212, the CPU 402 controls the display controller 408 and the projector 203 to display the received gesture image on the background image in a superimposed manner on the basis of the received layout information of the gesture image. Note that according to the present exemplary embodiment, the background image includes the image relating to a document shared by the remote site in advance, as illustrated in a flowchart described below.

In step S1213, the CPU 402 determines whether an instruction to terminate remote communication has been received. If an instruction to terminate remote communication has been received, the processing proceeds to S1009, where the termination process is performed. However, if an instruction to terminate remote communication has not been received, the processing returns to step S1211, and the loop processing related to reception of a gesture image is continued.

Through the processing described above, pointing motions of the users with their hands or fingers can be shared with the remote site during remote communication.

Transmission/Reception Process of Scanned Image

Sharing a meeting material during remote communication in the paper document sharing mode is described below with reference to FIGS. 15A and 15B.

Figure 15A:
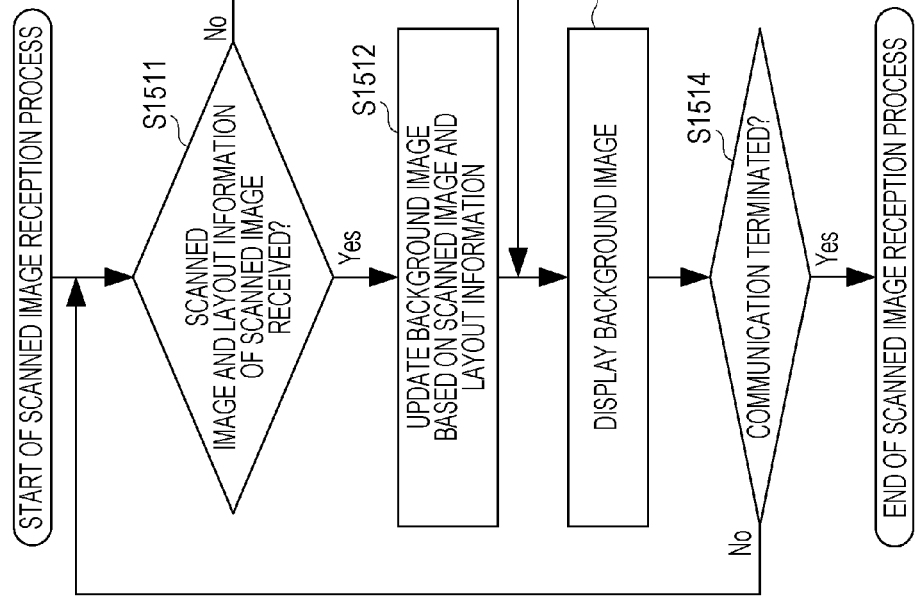
FIGS. 15A and 15B are flowcharts related to an example of a transmission and reception process of a meeting material according to at least one exemplary embodiment of the present disclosure.
Figure 15B:
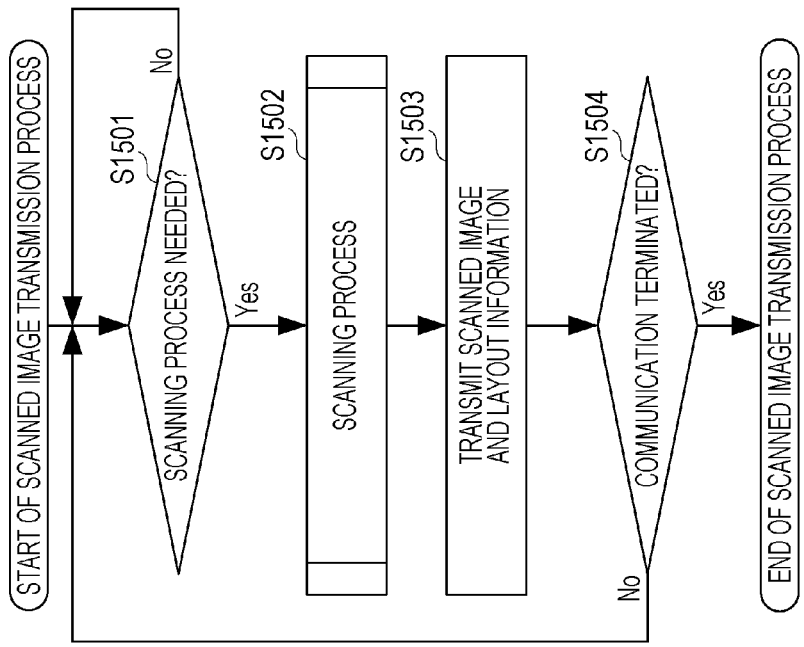

FIG. 15A is a flowchart illustrating the loop processing related to transmission of a scanned image. FIG. 15B is a flowchart illustrating the loop processing related to reception of the scanned image.

In step S1501, the CPU 402 determines whether a scanning process is necessary. When the scan button is selected by the user, the CPU 402 determines that a scanning process is necessary, and the processing proceeds to step S1502. Alternatively, if the CPU 402 determines that the coordinates of the object, such as a paper document, placed on the projection surface 103 are moved to a position that differs from the coordinates at the time of reception of the previous scan instruction, the CPU 402 determines that a scanning process is necessary, and the processing proceeds to step S1502. However, when the scan button is not selected or when the coordinates of the placed object has not been changed, the CPU 402 determines that a scanning process is unnecessary, and the processing returns to step S1501.

In step S1502, the CPU 402 performs a scanning process to scan an object, such as a paper document, placed on the projection area 104 and stores the scanned image in cooperation with the camera 202. The CPU 402 performs the processing illustrated in FIG. 8 in cooperation with the camera 202. Upon completion of the scanning process, the processing proceeds to step S1503.

In step S1503, the CPU 402 transmits the scanned image and the layout information of the scanned image acquired in step S1502 to the information processing apparatus of the remote communication partner. Through the processes in steps S1501 to S1503, an appropriate scanned image can be generated and transmitted when the user changes the meeting material to be shared with the communication partner or when the position of a meeting material is changed and the meeting material is to be re-scanned.

Subsequently, in step S1504, the CPU 402 determines whether an instruction to terminate remote communication has been received. If an instruction to terminate remote communication has been received, the processing proceeds to step S1009, where a termination process is performed. However, if an instruction to terminate remote communication has not been received, the processing returns to step S1501, where the loop processing related to transmission of a scanned image is continued.

The loop processing related to reception of a scanned image transmitted from an information processing apparatus at the remote site is described below with reference to FIG. 15B. In step S1511, the CPU 402 determines whether a scanned image and the layout of the scanned image have been received from the information processing apparatus at the remote site. If a scanned image and the layout of the scanned image have been received from the remote site, the processing proceeds to step S1512. However, if a scanned image and the layout of the scanned image have not been received from the remote site, the processing proceeds to step S1513.

In step S1512, the CPU 402 updates the background image on the basis of the received scanned image and layout information of the scanned image in cooperation with the display controller 408. For example, upon receiving, from the communication partner, the scanned image obtained through the series of processes illustrated in FIG. 10, the CPU 402 updates the background image as follows. First, the received image is rotated by using the received rotation angle θ as layout information. Subsequently, the background image is updated by enlarging or reducing the size of the rotated image so as to match the coordinates (P1, Q1), (P2, Q2), (P3, Q3), and (P4, Q4). Through such processing, the background image to be displayed can be updated in response to a change in the paper document or a change in the position of the paper document by the communication partner.

In step S1513, the CPU 402 projects the background image onto the projection area 104 in cooperation with the display controller 408 and the projector 203. Thereafter, the processing proceeds to step S1514.

In step S1514, the CPU 402 determines whether an instruction to terminate the remote communication has been received. If an instruction to terminate the remote communication has been received, the processing proceeds to step S1009. However, if an instruction to terminate the remote communication has not been received, the processing returns to step S1511, where the loop processing related to reception of the scanned image is continued.

Through the process described above, the object placed in a first conference room can be shared with a user in a second conference room during remote communication. In addition, in the second conference room, the scanned image of the object can be projected onto a position with a size and a posture (inclination of the document) so that the user feels as if they are sharing the document in the same physical space as the user in the first conference room.

Transmission/Reception Process of Electronic Meeting Material

Figure 16B:
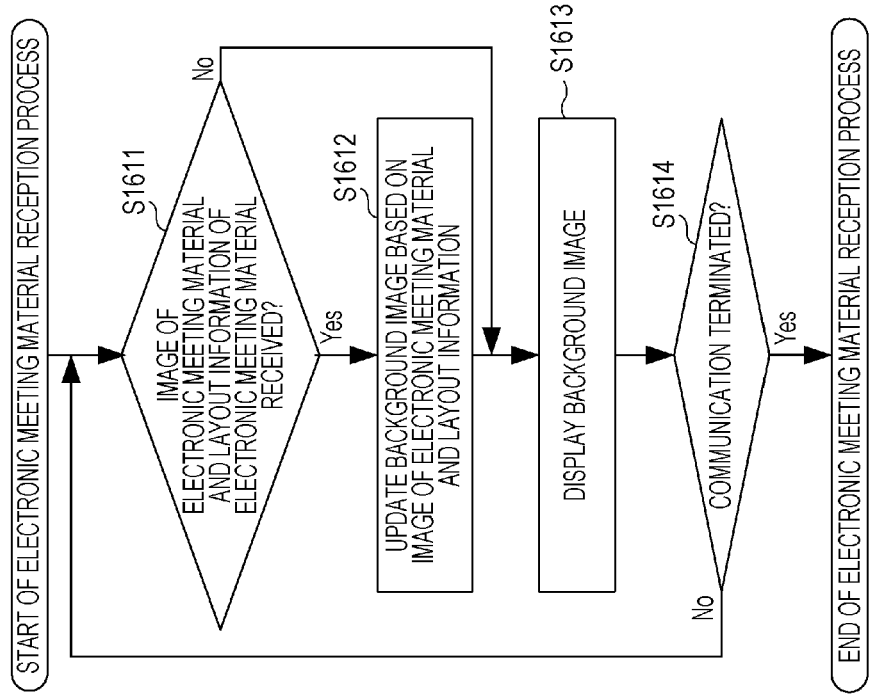
FIGS. 16A and 16B are flowcharts related to an example of a transmission and reception process of a meeting material according to at least one exemplary embodiment of the present disclosure.

Sharing of an electronic meeting material in remote communication in the data sharing mode is described below with reference to FIGS. 16A and 16B.

Figure 16A:
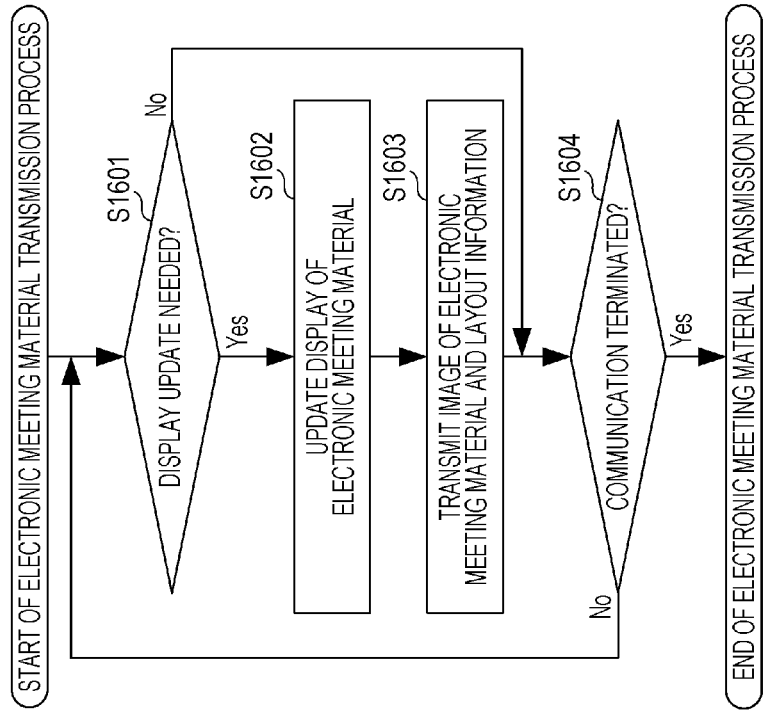

FIG. 16A is a flowchart illustrating the loop processing related to transmission of an electronic meeting material. FIG. 16B is a flowchart illustrating the loop processing related to reception of an electronic meeting material.

In step S1601, the CPU 402 determines whether display update is necessary. When a new electronic document (for example, a presentation document) is selected by the user or when an instruction to change the position or content of the electronic document is received from the user, the CPU 402 determines that display update is needed. Thus, the processing proceeds to step S1602. However, when no new electronic document is selected or when an instruction to change the position or content of the electronic document is not received, the processing proceeds to step S1604.

In step S1602, the CPU 402 updates the image to be projected and displayed onto the projection area 104 in cooperation with the display controller 408 and the projector 203. In step S1603, the CPU 402 transmits the image of the electronic document and the display layout information of the electronic document to the information processing apparatus of the communication partner. Thereafter, the processing proceeds to step S1604. Note that the layout information to be transmitted to the communication partner in step S1603 is acquired by the CPU 402 sending, to the operating system that performs overall control of the information processing apparatus, an inquiry about the coordinates of a drawing window in which the electronic document is displayed.

In step S1604, the CPU 402 determines whether an instruction to terminate the remote communication has been received. If an instruction to terminate the remote communication has been received, the processing proceeds to the termination process of S1009. However, if an instruction to terminate the remote communication has not been received, the processing returns to step S1601, where the loop processing related to transmission of an electronic document is continued.

The loop processing related to reception of an electronic document transmitted from an information processing apparatus at a remote site is described below with reference to FIG. 16B. In step S1611, the CPU 402 determines whether the image of an electronic document and the layout information of the electronic document have been received from the information processing apparatus at a remote site. If the image of an electronic document and the layout information of the electronic document have been received from the remote site, the processing proceeds to step S1612. However, if the image of an electronic document and the layout information of the electronic document have not been received from a remote site, the processing proceeds to step S1613.

In step S1612, the CPU 402 updates the received background image on the basis of the received layout information and the received image of an electronic document in cooperation with the display controller 408. In step S1613, the CPU 402 projects the background image onto the projection area 104 in cooperation with the display controller 408 and the projector 203. Thereafter, the processing proceeds to step S1614.

In step S1614, the CPU 402 determines whether an instruction to terminate the remote communication has been received. If an instruction to terminate the remote communication has been received, the processing proceeds to step S1009, where the termination process is performed. However, if an instruction to terminate the remote communication has not been received, the processing returns to step S1611, where the loop processing related to reception of a scanned image is continued.

Through the process described above, an electronic document displayed in one conference room can be shared with the users in the other conference room during remote communication.

Live Image Transmission/Reception Process

Figure 17B:
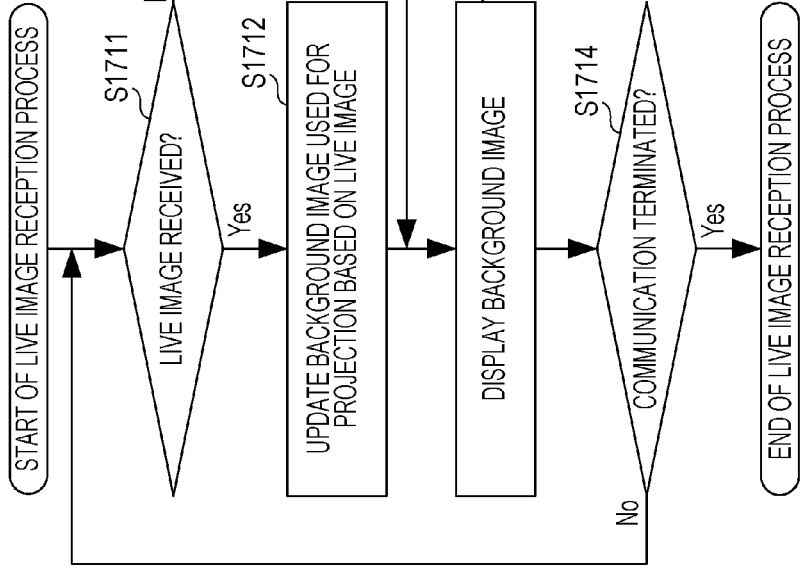
FIGS. 17A and 17B are flowcharts related to an example of a transmission and reception process of a meeting material according to at least one exemplary embodiment of the present disclosure.

Finally, sharing of a live image during remote communication in the live sharing mode is described below with reference to flowcharts illustrated in FIGS. 17A and 17B and the illustrations in FIGS. 18A and 18B.

Figure 17A:
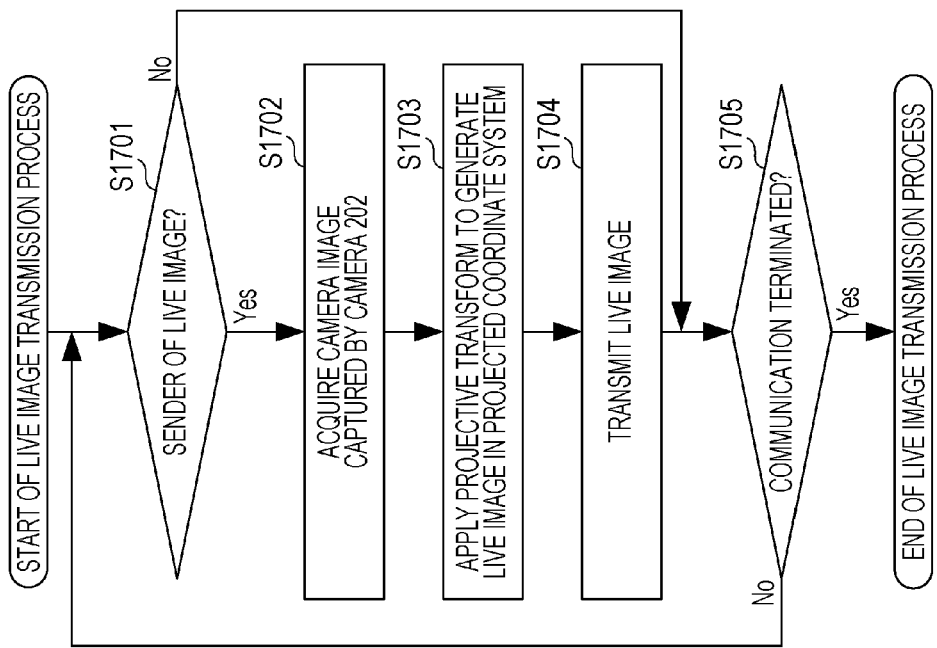

FIG. 17A is a flowchart illustrating the loop processing related to transmission of a live image. FIG. 17B is a flowchart illustrating the loop processing related to reception of a live image.

In step S1701, the CPU 402 determines whether the CPU 402 is a sender of a live image. When the operation mode shared with the communication partner is the live sharing mode and, thus, a live image is to be transmitted to the communication partner, the CPU 402 determines that the CPU 402 is the sender of a live image. Thus, the processing proceeds to step S1702. However, when the operation mode is not the live sharing mode or when the operation mode is the live sharing mode and if the CPU 402 serves as a client that receives a live image from the communication partner, the CPU 402 determines that the CPU 402 is not the sender of a live image. Consequently, the processing proceeds to step S1704. Through such processing, when the operation mode is the live sharing mode and if the apparatus operates as a client that receives a live image, transmission of the live image can be skipped.

In step S1702, the CPU 402 controls the camera 202 to acquire a camera image. According to the present exemplary embodiment, for example, the CPU 402 controls the camera 202 to acquire a camera image every one second. However, the acquisition technique is not limited thereto. For example, the camera image may be acquired every N seconds in accordance with the processing power of the CPU 402 or the depth sensor 204 or the load imposed on the network 400.

In step S1703, the CPU 402 applies a projective transform to the image of the area corresponding to the projection area 104 in the camera image obtained in step S1703 to obtain the image in the projection coordinate system. Thus, the CPU 402 generates a live image to be transmitted to the communication partner. The transform process into the projected coordinate system is the same as that in step S806 for the scanning process described with reference to FIG. 8. Accordingly, the detailed description is not repeated.

In step S1704, the CPU 402 transmits the live image generated in step S1703 to the information processing apparatus of the communication partner. Thereafter, the processing proceeds to step S1705.

In step S1705, the CPU 402 determines whether an instruction to terminate remote communication has been received. If an instruction to terminate remote communication has been received, the processing proceeds to step S1009, where the termination process is performed. However, if an instruction to terminate remote communication has not been received, the processing returns to step S1701, where the loop processing related to transmission of the live image is continued.

The loop processing related to reception of a live image transmitted from an information processing apparatus at a remote site is described below with reference to FIG. 17B. In step S1711, the CPU 402 determines whether a live image has been received from an information processing apparatus at the remote site. If a live image has been received from the remote site, the processing proceeds to step S1712. However, if a live image has not been received from the remote site, the processing proceeds to step S1713.

In S1712, the CPU 402 updates the background image on the basis of the received live image in cooperation with the display controller 408.

In step S1713, the CPU 402 projects the background image onto the projection area 104 in cooperation with the display controller 408 and the projector 203. Thereafter, the processing proceeds to step S1714.

In step S1714, the CPU 402 determines whether an instruction to terminate remote communication has been received. If an instruction to terminate remote communication has been received, the processing proceeds to step S1009, where the termination process is performed. However, if an instruction to terminate remote communication has not been received, the processing returns to step S1711, where the loop processing related to reception of a live image is continued.

Figure 18A:
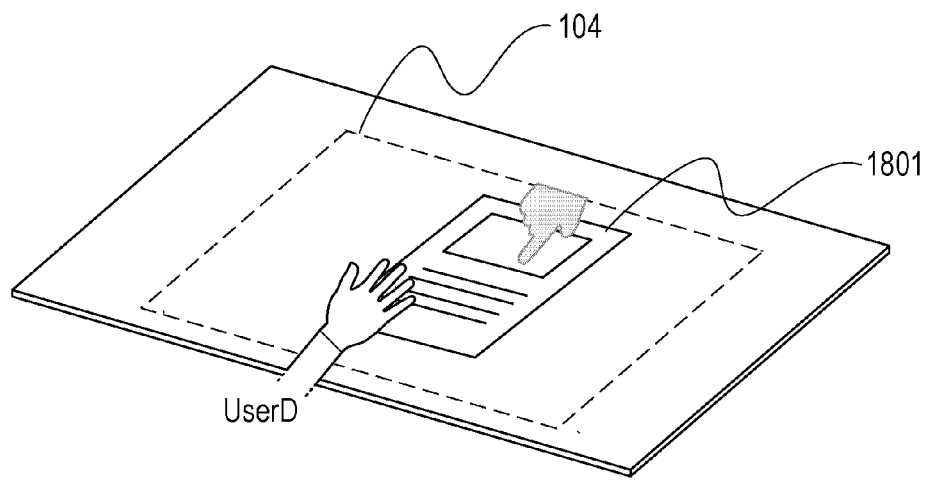
FIGS. 18A and 18B illustrate an example of transmission and reception of a live image according to at least one exemplary embodiment of the present disclosure.
Figure 18B:
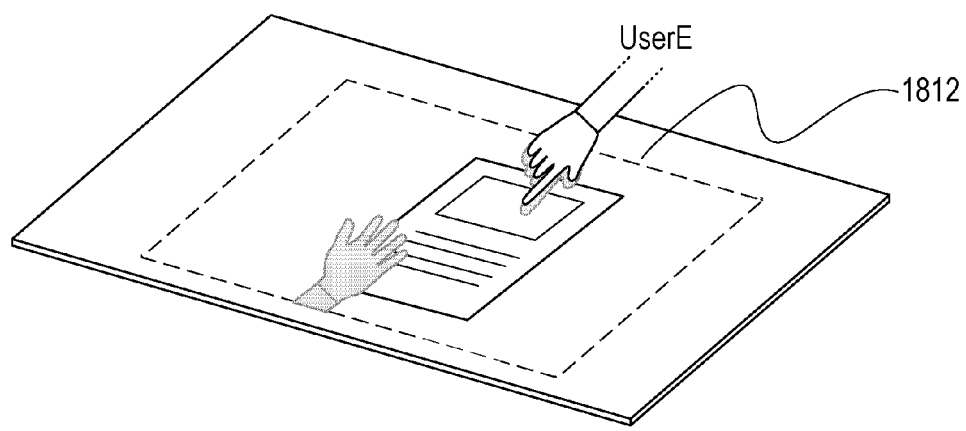

FIGS. 18A and 18B illustrate remote communication performed in the live sharing mode. FIG. 18A illustrates the projection area in a conference room from which the live image is transmitted. FIG. 18B illustrates the projection area in the conference room in which a live image is received. For example, an object 1801, such as a paper document, is placed inside the projection area 104 in a conference room A from which a live image is transmitted. In addition, User D is located in conference room A. User D points their hand or finger towards the placed object 1801. Furthermore, User E is located in conference room B in which the live image is received. User E points their hand or finger towards the live image received from the information processing apparatus of the communication partner.

In this case, the information processing apparatus in conference room A generates a camera image captured in the process in step S1703. The camera image includes the images of the object 1801, the hand of User D, and a gesture image projected by the projector 203. Accordingly, the live image transmitted to conference room B in step S1704 also contains the images of the object 1801, the hand of User D, and the gesture image projected by the projector 203.

Accordingly, as illustrated in FIG. 18B, in conference room B in which the live image is received, a live image 1812 including the work result in conference room A during communication can be periodically received from the information processing apparatus placed in conference room A, and the live image can be periodically updated. Thus, User E in conference room B can view the work information of User D as if User E were located in the same space as User D in conference room A. In addition, User E located in conference room B in which the live image is received can support User D located in conference room A by pointing their hand or finger to the above-described live image updated in real time and commenting with their voice. A pointing motion performed by User E is transmitted to the information processing apparatus in conference room A through the loop processing for transmitting a gesture image described in FIG. 12A and is projected onto the projection area in conference room A through the loop processing for receiving a gesture image described in FIG. 12B. As a result, User D located in conference room A can be supported by the speech or a pointing operation of User E at a remote site in a manner as if User D were located in the same space as User E.

As described above, in the communication system according to the present exemplary embodiment, the users located in a plurality of conference rooms at a plurality of sites can share physical documents, such as paper documents. In addition, the users located in a plurality of conference rooms can share the gestures of the users made on the shared document by using their hands or fingers. As a result, the users at remote sites can bi-directionally communicate with one another as if they were in the same conference room.

In addition, when communication is performed in the live sharing mode, the images of a gesture and an operation to write an annotation on a paper document by a user located in a first conference room can be shared with a user located in a second conference room in real time. Furthermore, a gesture of a user at a second site performed on a shared document by using their hand or finger can be shared with the user at a first site. For example, through communicating in the live sharing mode, a member of a customer support center at a remote site can understand the action of a customer located at a customer service desk and support the customer by using the image of their hand or fingers and a voice conversation. Accordingly, the customer support member can assist the customer remotely in the same manner as in a face-to-face service.

According to one aspect of the present exemplary embodiment, communicate with a remote site can be provided in the same manner as in the same physical space in which the users share meeting materials and communicate with each other.

Other Embodiments

While the first exemplary embodiment has been described with reference to the case where the host which starts remote communication selects the document sharing mode at the start of the remote communication. However, the processing is not limited thereto. For example, during remote communication, the operation mode may be switched as appropriate in accordance with an instruction from a user located in any one of the conference rooms.

In addition, while the first exemplary embodiment has been described with reference to the case where remote communication is performed between two conference rooms, remote communication is not limited thereto. For example, the present disclosure is applicable to remote communication performed among three or more conference rooms.

Furthermore, the present exemplary embodiment has been described with reference to the method for extracting, as a gesture of the user made their hand or finger, an image area for which the value acquired by the range sensor is determined to be within the range d1 illustrated in FIGS. 2A and 2B, a method for extracting a gesture of the user is not limited thereto. For example, a neural network that receives the pixel values of a RGB image and the values acquired by the range sensor as the input values may be created in advance, and the gesture area may be extracted by using calculation based on the neural network. In this case, the parameters of each of layers constituting the neural network are adjusted in advance through learning based on a set of training data provided in advance so that a gesture image is detected. Alternatively, by appropriately combining an object detection process using a neural network and an object extraction process based on a range sensor, a gesture area may be extracted.

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-150103 filed Jul. 29, 2016, which is hereby incorporated by reference herein in its entirety.

What is claimed is:

1. A remote communication system comprising:
a first information processing apparatus, the first information processing apparatus including:
a first projection device;
at least one control circuit configured to function as:
a first projection unit that controls the first projection device to project an image onto a first projection surface,
an acquisition unit that acquires, as a meeting material shared with a user at a remote site, an image of a document placed on the first projection surface,
a first image capturing unit that captures an image of an area including a projection area projected by the first projection device by using an imaging device,
a first detection unit that detects a distance to an object for each of pixels of an image captured by the first image capturing unit,
and a first extraction unit that extracts an image indicating a user and included in the image captured by the first image capturing unit on a basis of the distances detected by the first detection unit; and
a storage unit that stores a mode for sharing a meeting material with a user at the remote site; and
a second information processing apparatus set at the remote site, the second information processing apparatus including:
a second projection device; and
at least one control circuit configured to function as:
a second projection unit that controls the second projection device to project an image onto a second projection surface,
a second image capturing unit that captures an image of an area including a projection area projected by the second projection device by using an imaging device,
a second detection unit that detects a distance to an object for each of pixels of the image captured by the second image capturing unit, and
a second extraction unit that extracts an image indicating a user located at the remote site and included in the image captured by the second image capturing unit on a basis of the distances detected by the second detection unit,
wherein the first projection unit projects, onto the first projection surface, an image including at least an image indicating the user at the remote site and extracted by the second extraction unit,
wherein the second projection unit projects, onto the second projection surface, the image of the document acquired by the acquisition unit and the image indicating the user extracted by the first extraction unit, and
wherein the first information processing apparatus and the second information processing apparatus switch a scheme for sharing a meeting material on a basis of the mode stored in the storage unit.

2. The remote communication system according to claim 1, wherein the acquisition unit acquires, from the image captured by the first image capturing unit, an image of the document placed on the first projection surface and a position at which the document is placed, and wherein based on an image of the document placed at the first projection surface and acquired by the acquisition unit and the position at which the document is placed, the second projection unit projects, onto the second projection surface, the image of the document and an image indicating the user extracted by the first extraction unit in a superimposed manner.

3. The remote communication system according to claim 1, wherein the first information processing apparatus further includes:

a selection unit configured to select an electronic document shared with a user at the remote site, wherein when the storage unit stores a mode for sharing an electronic document with a user at the remote site, the acquisition unit acquires an image based on the electronic document selected by the selection unit and a position at which the image is to be projected, wherein the first projection unit further projects, onto the first projection surface, the electronic document selected by the selection unit and an image indicating the user at the remote site and extracted by the second extraction unit in a superimposed manner, and wherein on a basis of the image based on the electronic document acquired by the acquisition unit and a position at which the image is to be projected, the second projection unit further projects, onto the second projection surface, the image based on the electronic document and the image indicating the user and extracted by the first extraction unit in a superimposed manner.

4. The remote communication system according to claim 1, wherein the first information processing apparatus further includes:

a reception unit configured to receive a user operation; and a control unit configured to start remote communication with the second information processing apparatus upon detecting a user operation to start remote communication and terminate the remote communication with the second information processing apparatus upon detecting a user operation to terminate the remote communication via the reception unit.

5. The remote communication system according to claim 4, wherein the reception unit is a touch pad placed on the first projection surface, wherein upon detecting that predetermined coordinates are touched via the touch pad, the control unit controls the first projection unit to project a user interface (UI) image in a vicinity of the predetermined coordinates, wherein upon detecting that an area of an icon displayed as the UI image for starting remote communication is touched, the control unit starts remote communication with the second information processing apparatus, and wherein upon detecting that an area of an icon displayed as the UI image for terminating remote communication is touched, the control unit terminates the remote communication with the second information processing apparatus.

6. The remote communication system according to claim 1, wherein the first information processing apparatus further includes:

a first transmission unit configured to transmit an image to the second information processing apparatus; and a first reception unit configured to receive an image from the second information processing apparatus, wherein the second information processing apparatus further includes:

a second transmission unit configured to transmit an image to the first information processing apparatus; and a second reception unit configured to receive an image from the first information processing apparatus, wherein the first projection unit projects the image received from the second information processing apparatus via the first reception unit, and wherein the second projection unit projects the image received from the first information processing apparatus via the second reception unit.

7. A remote communication system comprising:

a first information processing apparatus, the first information processing apparatus including:

a first projection device;

at least one control circuit configured to function as:

a first projection unit that controls the first projection device to project an image onto a first projection surface, a first image capturing unit that captures an image of an area including a projection area projected by the first projection unit by using an imaging device, and a generation unit that generates an image of an area corresponding to the projection area from the image captured by the first image capturing unit; and a storage unit that stores a mode for sharing a meeting material with a user at a remote site; and a second information processing apparatus set at the remote site, the second information processing apparatus including:

a second projection device; and at least one control circuit configured to function as:

a second projection unit that controls the second projection device to project an image onto a second projection surface, a second image capturing unit that captures an image of an area including a projection area projected by the second projection unit by using an imaging device, a detection unit that detects a distance to an object for each of pixels of the image captured by the second image capturing unit, and an extraction unit that extracts an image which indicates a user located at the remote site and which is included in the image captured by the second image capturing unit on a basis of the distances detected by the detection unit, wherein the first projection unit projects, onto the first projection surface, an image including at least the image which indicates the user at the remote site and which is extracted by the extraction unit, wherein the second projection unit projects, onto the second projection surface, the image generated by the generation unit, and wherein the first information processing apparatus and the second information processing apparatus switch a scheme for sharing a meeting material on a basis of the mode stored in the storage unit.

8. The remote communication system according to claim 7, wherein the first information processing apparatus further includes:
- a first transmission unit configured to transmit an image to the second information processing apparatus; and
- a first reception unit configured to receive an image from the second information processing apparatus,
- wherein the second information processing apparatus further includes:
- a second transmission unit configured to transmit an image to the first information processing apparatus; and
- a second reception unit configured to receive an image from the first information processing apparatus,
- wherein the first projection unit projects the image received from the second information processing apparatus via the first reception unit, and
- wherein the second projection unit projects the image received from the first information processing apparatus via the second reception unit.

9. A method for controlling a remote communication system including a first information processing apparatus and a second information processing apparatus set at a remote site, the method comprising:
- projecting an image onto a first projection surface by using the first information processing apparatus;
- acquiring, as an image of a meeting material shared by a user at the remote site, an image of a document placed on the first projection surface by using the first information processing apparatus;
- capturing an image of an area including a projected projection area by using the first information processing apparatus;
- detecting a distance to an object for each of pixels of the captured image;
- extracting an image indicating a user included in the captured image on a basis of the detected distances;
- storing a mode for sharing a meeting material with a user at the remote site;
- projecting an image onto a second projection surface by using the second information processing apparatus;
- capturing an image of an area including a projected projection area by using the second information processing apparatus;
- detecting a distance to an object for each of pixels of the captured image by using the second information processing apparatus; and
- extracting an image indicating a user located at the remote site and included in the capture image on a basis of the detected distances by using the second information processing apparatus,
- wherein in projecting an image onto a first projection surface by using the first information processing apparatus, an image including at least an extracted image indicating the user at the remote site is projected onto the first projection surface,
- wherein in projecting an image onto a second projection surface by using the second information processing apparatus, the acquired image indicating the document and the extracted image indicating the user are projected onto the second projection surface, and
- wherein the first information processing apparatus and the second information processing apparatus switch a scheme for sharing a meeting material on a basis of the stored mode.

10. A method for controlling a remote communication system including a first information processing apparatus and a second information processing apparatus set at a remote site, the method comprising:
- projecting an image onto a first projection surface by using the first information processing apparatus;
- capturing an image of an area including a projected projection area by using the first information processing apparatus;
- generating an image corresponding to the projection area from the captured image by using the first information processing apparatus;
- storing a mode for sharing a meeting material with a user at the remote site;
- projecting an image onto a second projection surface by using the second information processing apparatus;
- capturing an image of an area including a projected projection area by using the second information processing apparatus;
- detecting a distance to an object for each of pixels of the captured image by using the second information processing apparatus; and
- extracting an image which indicates a user located at the remote site and which is included in the capture image on a basis of the detected distances by using the second information processing apparatus,
- wherein in projecting an image onto a first projection surface by using the first information processing apparatus, an image including at least the extracted image indicating the user located at the remote site is projected onto the first projection surface,
- wherein in projecting an image onto a second projection surface by using the second information processing apparatus, the generated image is projected onto the second projection surface, and
- wherein the first information processing apparatus and the second information processing apparatus switch a scheme for sharing a meeting material on a basis of the stored mode.

* * * * *